United States Patent
Oerton

(10) Patent No.: US 9,386,398 B2
(45) Date of Patent: Jul. 5, 2016

(54) MANAGEMENT OF MOBILE HOTSPOT CONNECTIONS

(71) Applicant: BlackBerry Limited, Waterloo (CA)

(72) Inventor: Kevin John Oerton, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 14/305,698

(22) Filed: Jun. 16, 2014

(65) Prior Publication Data

US 2014/0295830 A1    Oct. 2, 2014

Related U.S. Application Data

(63) Continuation of application No. 12/905,303, filed on Oct. 15, 2010, now Pat. No. 8,804,517.

(60) Provisional application No. 61/349,982, filed on May 31, 2010.

(51) Int. Cl.
*H04L 12/26* (2006.01)
*H04W 4/00* (2009.01)
*H04W 72/10* (2009.01)
*H04W 88/04* (2009.01)
*H04W 88/02* (2009.01)

(52) U.S. Cl.
CPC .............. *H04W 4/003* (2013.01); *H04W 4/001* (2013.01); *H04W 72/10* (2013.01); *H04W 88/04* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 5,608,874 A | 3/1997 | Ogawa et al. | |
| 7,206,593 B1 | 4/2007 | Yarkosky et al. | |
| 8,174,982 B2 | 5/2012 | Buddhikot et al. | |
| 2007/0124390 A1 | 5/2007 | Sivakumar et al. | |
| 2007/0249316 A1 | 10/2007 | Rao | |
| 2008/0039102 A1 | 2/2008 | Sewall et al. | |
| 2008/0279161 A1* | 11/2008 | Stirbu et al. | 370/338 |

(Continued)

FOREIGN PATENT DOCUMENTS

| | | |
|---|---|---|
| WO | 2004032536 A2 | 4/2004 |
| WO | 2007095546 A2 | 8/2007 |

OTHER PUBLICATIONS

Extended European Search Report dated Feb. 24, 2011 from EP10187814.8, 8 pgs.

(Continued)

*Primary Examiner* — Chi H Pham
*Assistant Examiner* — Raul Rivas
(74) *Attorney, Agent, or Firm* — Rowand LLP

(57) ABSTRACT

A system and method implemented at a communication device or mobile hotspot device for providing access to data services over a wireless communication network to one or more user devices. The communication or hotspot device is adapted to provide router, mobile hotspot-type or ad hoc networking functions to user devices such as laptops, tablets, and other entertainment and productivity devices adapted to communicate over a wireless LAN and to provide access to broadband data services. The data services provided over the network may be subject to one or more data allowances or data transfer limits. The communication or hotspot device is adapted to manage the user device connections and data transfer to and from the communication device within the data allowances or according to predetermined prioritization.

17 Claims, 13 Drawing Sheets

(56) References Cited

U.S. PATENT DOCUMENTS

| | | |
|---|---|---|
| 2008/0313327 A1 | 12/2008 | Sewall et al. |
| 2009/0005002 A1 | 1/2009 | Agarwal |
| 2009/0129319 A1 | 5/2009 | Buddhihot et al. |
| 2012/0215911 A1 | 8/2012 | Raleigh et al. |

OTHER PUBLICATIONS

Novatel Wireless: "MIFI—User Guide", Internet, Dec. 31, 2009, pp. 6PPP, 1-102, XP002615789, retrieved from the Internet: URL:http://www3.ipass.com/wp-content/uploads/2010/10/Novatel_MiFi_UserGuide.pdf, accessed Jan. 6, 2011.

e-office, "Mobile Data Alerter for BlackBerry", retrieved from the Internet: URL:http://mobile.e-office.com/Products/Mobile-Data-Alerter, published at least as early as May 24, 2011, 3 pgs.

AndroLib, "3G Watchdog", May 19, 2011, retrieved from the Internet: URL:http://www.androlib.com/android.application.net-rgruet-android-g3watchdog-zzA.aspx, accessed May 24, 2011, 4 pgs.

AndroLib, "Screenshot of 3G Watchdog", retrieved from the Internet: URL: http://www.androlib.com/android.screenshot.app.zzA-wqp.u.aspx, published at least as early as May 24, 2011, 3 pgs.

AndroLib, "Screenshot of 3G Watchdog", retrieved from the Internet: URL:http://www.martinadamek.com/2008/12/18/apndroid/, accessed May 24, 2011, 3 pgs.

Adamek, M., APNdroid, Dec. 18, 2008, retrieved from the Internet: URL:http://www.martinadamek.com/2008/12/18/apndroid/, accessed May 24, 2011, 3 pgs.

Another Human Being blogspot, "Android Data Diet (Part 2)", Jun. 3, 2010, retrieved from the Internet: URL:http://another-human-being.blogspot.com/2010/06/android-data-diet-part-2.html, accessed May 24, 2011, 2 pgs.

Cellhire LLC, "Keeping control of your data usage", retrieved from the Internet: URL:http://www.cellhire.com/support/datamanager/data-usage, published at least as early as May 24, 2011, 5 pgs.

Cellhire LLC, DataManager Help, retrieved from the Internet: URL:http://www.cellhire.com/support/datamanager, published at least as early as May 24, 2011, 5 pgs.

Chowdhury, K., Radhakrishnan, S. E., "System and method for measuring and reporting service usage", Jun. 19, 2006, retrieved from the Internet: URL:http://www.google.com/patents/about?id=4_WiAAAAEBAJ, accessed May 24, 2011, 2 pgs.

Tidal Pool Software, "Tether", retrieved from the Internet: URL:http://www.tidalpool.ca/tether/index.html, published at least as early as May 24, 2011, 2 pgs.

LemonJar Pty Ltd., "ISP Usage", Apr. 7, 2010, retrieved from the Internet: URL:http://lemonjar.com/?p=apps.ispusage, accessed May 24, 2011, 1 pg.

Batz, R. M., Menditto, L. F., White, J. G., "System and method for managing end user approval for charging in a network . . . ", Aug. 27, 2004, retrieved from the Internet: URL:http://www.google.com/patents/about?id=vvqaAAAAEBAJ&dq=data+quota+roaming, accessed May 24, 2011, 3 pgs.

Google, "Data Quota", retrieved from the Internet: URL:http://code.google.com/p/dataquota/, published at least as early as May 24, 2011, 2 pgs.

Research in Motion Limited, "Mobile Minutes Tracker", retrieved from the Internet: URL:http://appworld.blackberry.com/webstore/content/2616, published at least as early as May 24, 2011.

Examination Report dated Sep. 15, 2011 from EP 10187814.8, 4 pgs.

Examination Report dated Aug. 8, 2012 from EP 10187814.8, 5 pgs.

CIPO, CA Office Action relating to Application No. 2,737,994, dated May 13, 2015.

\* cited by examiner

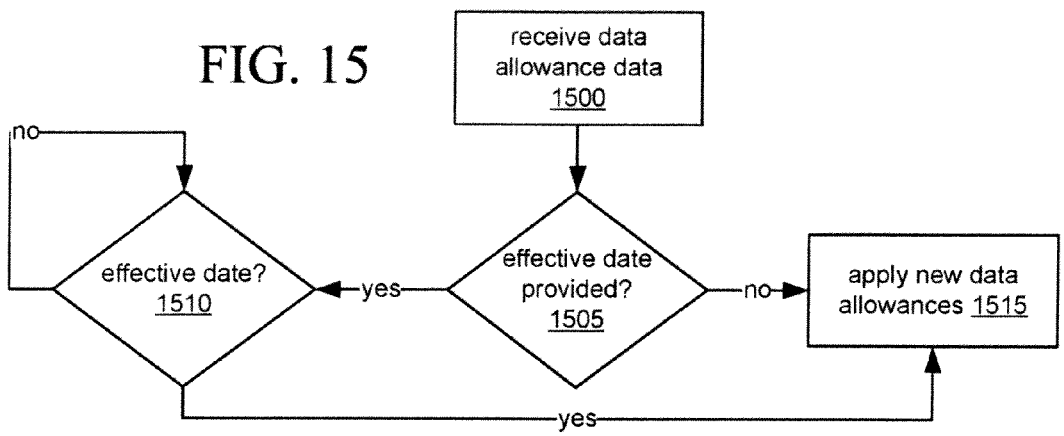
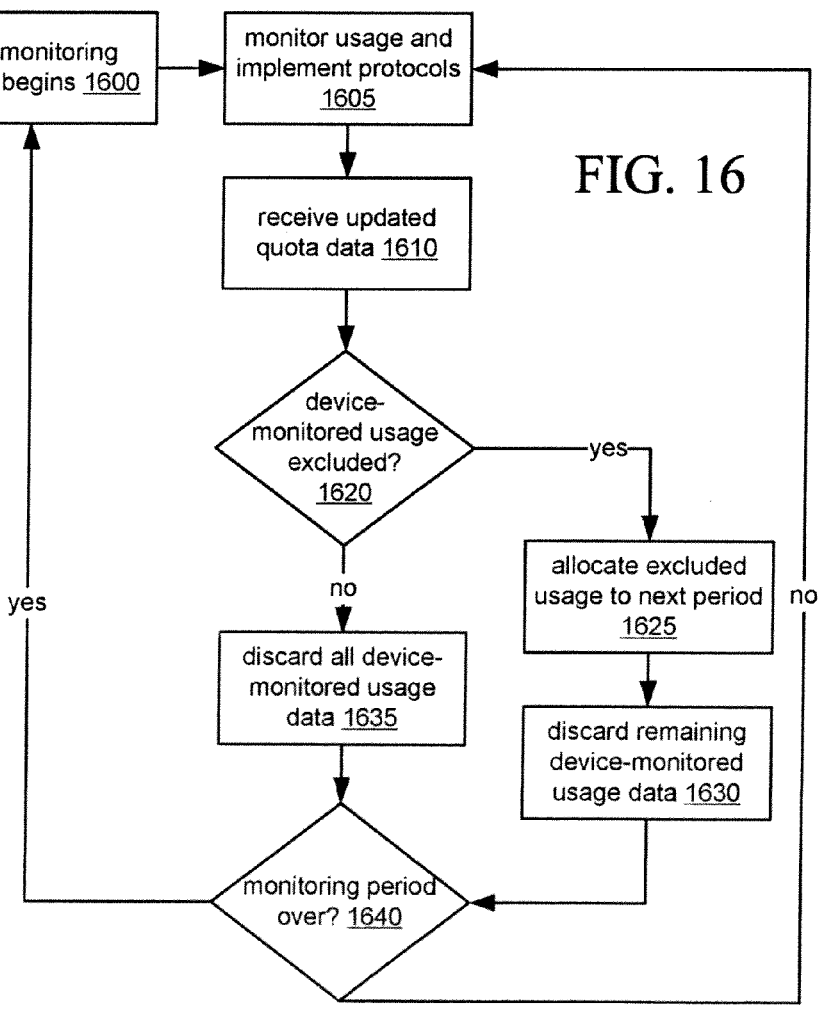

MANAGEMENT OF MOBILE HOTSPOT CONNECTIONS

REFERENCE TO PRIOR APPLICATIONS

This application is a continuation of U.S. application Ser. No. 12/905,303 filed Oct. 15, 2010, which claims priority from U.S. Application No. 61/349,982 filed May 31, 2010, the entireties of which are incorporated herein by reference.

BACKGROUND

1. Technical Field

The present application relates to management of device connections at a mobile hotspot.

2. Description of the Related Art

A communication device, such as a smartphone or a separate Wi-Fi™ access device adapted to communicate over a wireless 3G, 4G, or similar network, may be configured to operate as a router or mobile "hotspot" to provide nearby user devices with Internet access, using the 3G or 4G network for the broadband backhaul. When another user device equipped with Wi-Fi or similar wireless LAN functionality, such as a laptop, tablet, or other entertainment or productivity device is brought within the vicinity of the communication device or hotspot device, these other user devices may access the Internet or other networks via the wireless data services provided to the communication device.

BRIEF DESCRIPTION OF THE DRAWINGS

In drawings which illustrate by way of example only embodiments of the present application.

FIG. 15 is a flowchart illustrating a method for applying data allowance information at the communication device.

FIG. 16. is a flowchart illustrating a method for tracking data service consumption at the communication device.

DETAILED DESCRIPTION

Figure 1:
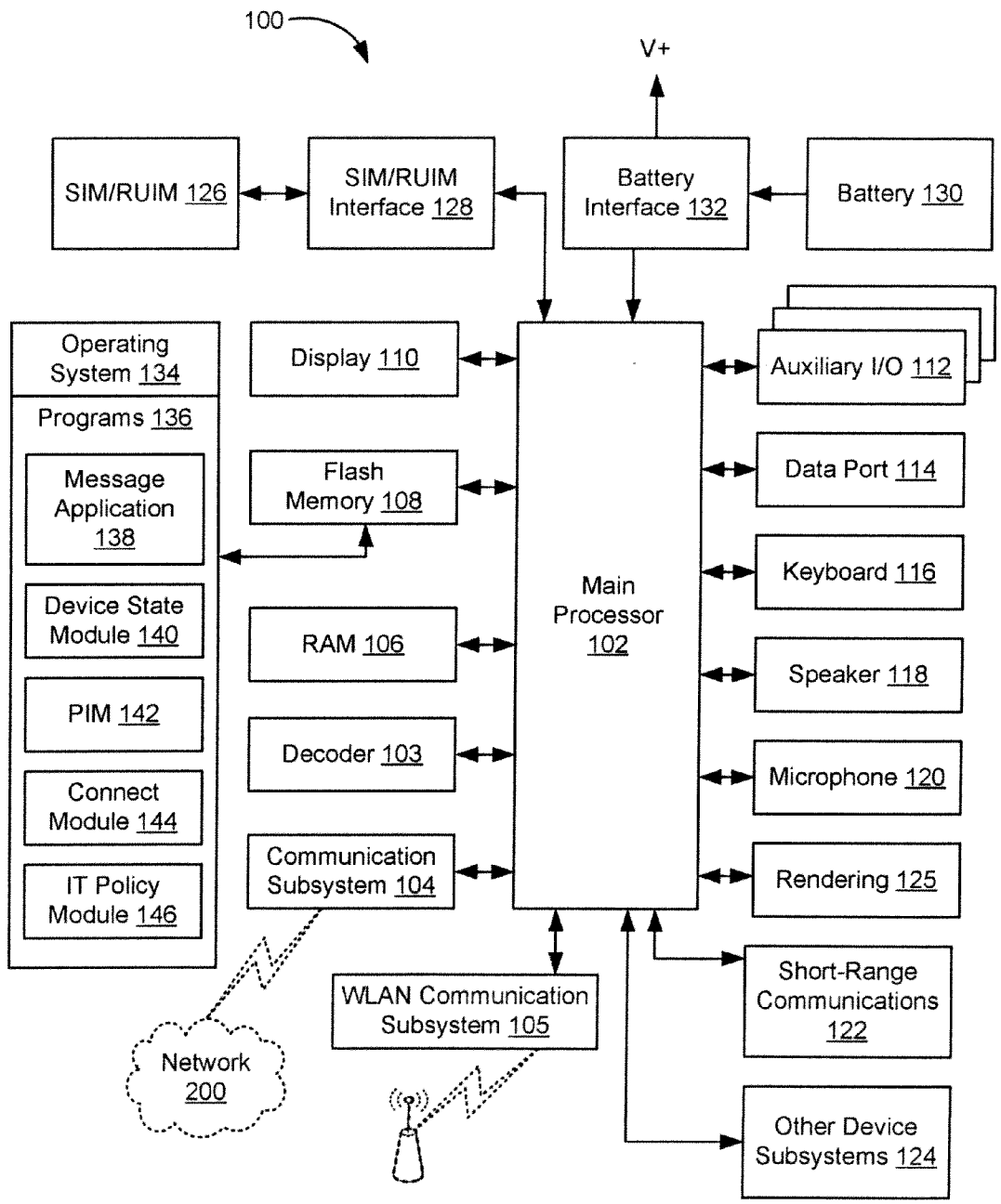
FIG. 1 is a block diagram of an embodiment of a mobile device.

The embodiments described herein provide a system, method, and a mobile device for managing one or more connections to a mobile hotspot and to a mobile device providing hotspot functions.

These embodiments will be described primarily in relation to a mobile wireless communication device such as a smartphone, hereafter referred to as a mobile device. It will be appreciated by those skilled in the art, however, that this description is not intended to limit the scope of the described embodiments to smartphones. The methods and systems described herein may be applied to any appropriate communication or data processing device, whether portable or not, including without limitation cellular phones, smartphones, organizers, personal digital assistants, desktop computers, terminals, laptops, tablets, notebook computers and the like.

Accordingly, there is provided a method for managing one or more connections to a data service, the method comprising providing, by a first device in communication with a wireless network providing the data service, access to the data service to a plurality of user devices; monitoring, at the first device, data transfer by the plurality of user devices using the data service within at least a first region; and when a limit of data transfer has been reached at the first device, implementing a management protocol to manage connectivity of the plurality of user devices with the first device. In one aspect of the method, the management protocol comprises disconnecting at least one of the plurality of user devices from the first device, or disabling the data service at the first device. In a further aspect, the connections of each of the plurality of user devices with the first device may be prioritized, and the management protocol comprises disconnecting a user device with a lowest priority. The limit of data transfer may associated with the first region. It may also be an aggregate amount associated with all regions in which the first device accesses data services, and may be reached through the aggregated data transfer by more than one of the plurality of user devices. Monitoring of data transfer by the plurality of user devices may involve the first device monitoring the data transfer between the first device and the data service in real time. The data transfer limit may be associated with a predefined reporting period, such that monitoring comprises receiving data transfer information associated with a first reporting period over the wireless network; reconciling the received data transfer information with real time data transfer information recorded at the first device; and allocating any real time data transfer information not reconciled with the received data transfer information to a further reporting period. There is also provided a computer program product comprising a computer-readable medium bearing code executable to carry out the foregoing methods.

There is also provided a device, which may include either a smartphone or a mobile hotspot device, to carry out the foregoing methods. The device may comprise a first communications subsystem for communicating wirelessly with a plurality of mobile devices, which may be configured to implement an 802.11 protocol; a second communications subsystem for providing access to data services supplied over a wireless network; and a processor adapted to monitor data transfer by the plurality of user devices using the data service within at least a first region; and when a limit of data transfer has been reached, implement a management protocol to manage access by the plurality of user devices to the data service. The second communications subsystem, if a mobile hotspot device, may be configured to communicate with a smartphone that is configured to communicate over the wireless network. Otherwise, the second communications subsystem may be configured to communicate over the wireless network itself. As above, the management protocol may comprise disconnecting at least one of the plurality of user devices from said device, disabling the data service at the device, or disconnecting a user device with a lowest priority if the connections of each of the plurality of user devices with the device are prioritized.

Figure 2:
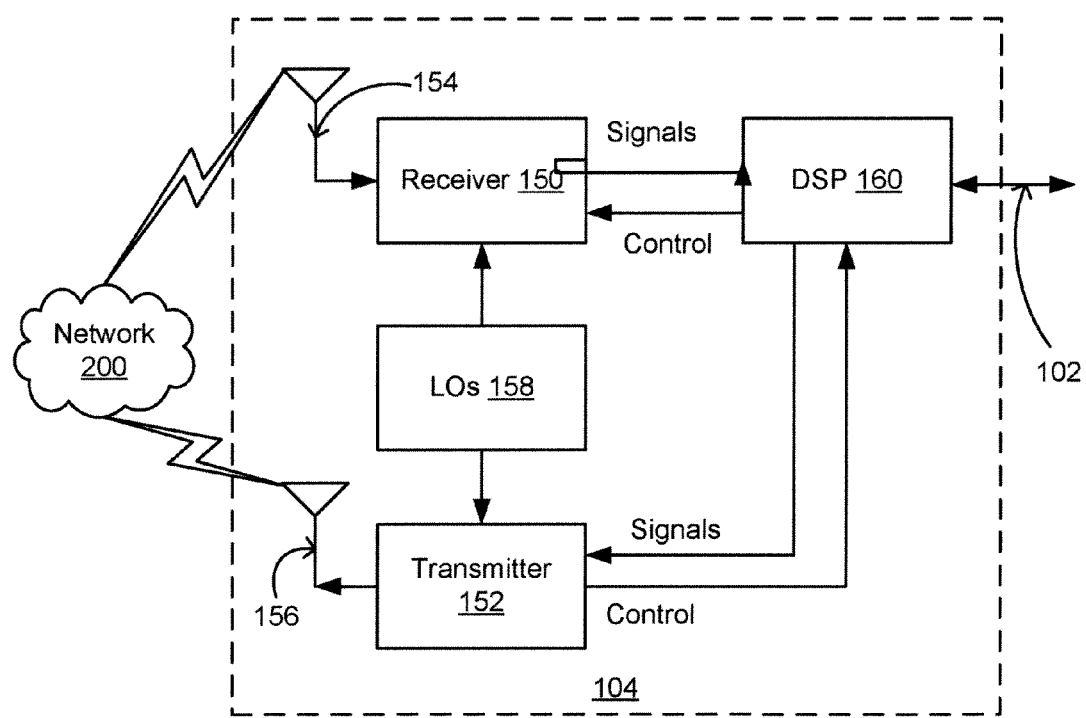
FIG. 2 is a block diagram of an embodiment of a communication subsystem component of the mobile device of FIG. 1.
Figure 3:
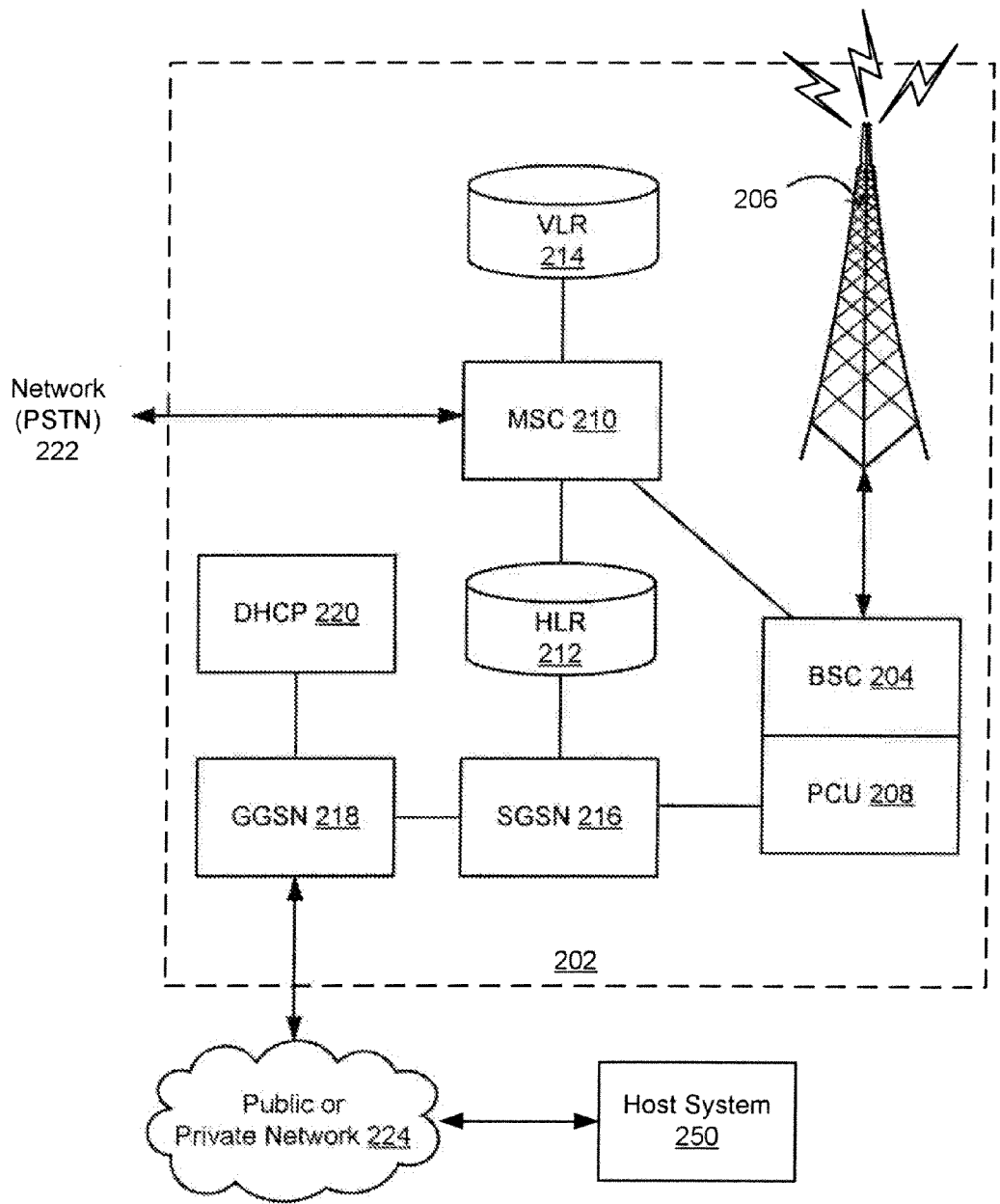
FIG. 3 is an exemplary block diagram of a node of a wireless network for use with the mobile device of FIG. 1.
Figure 4:
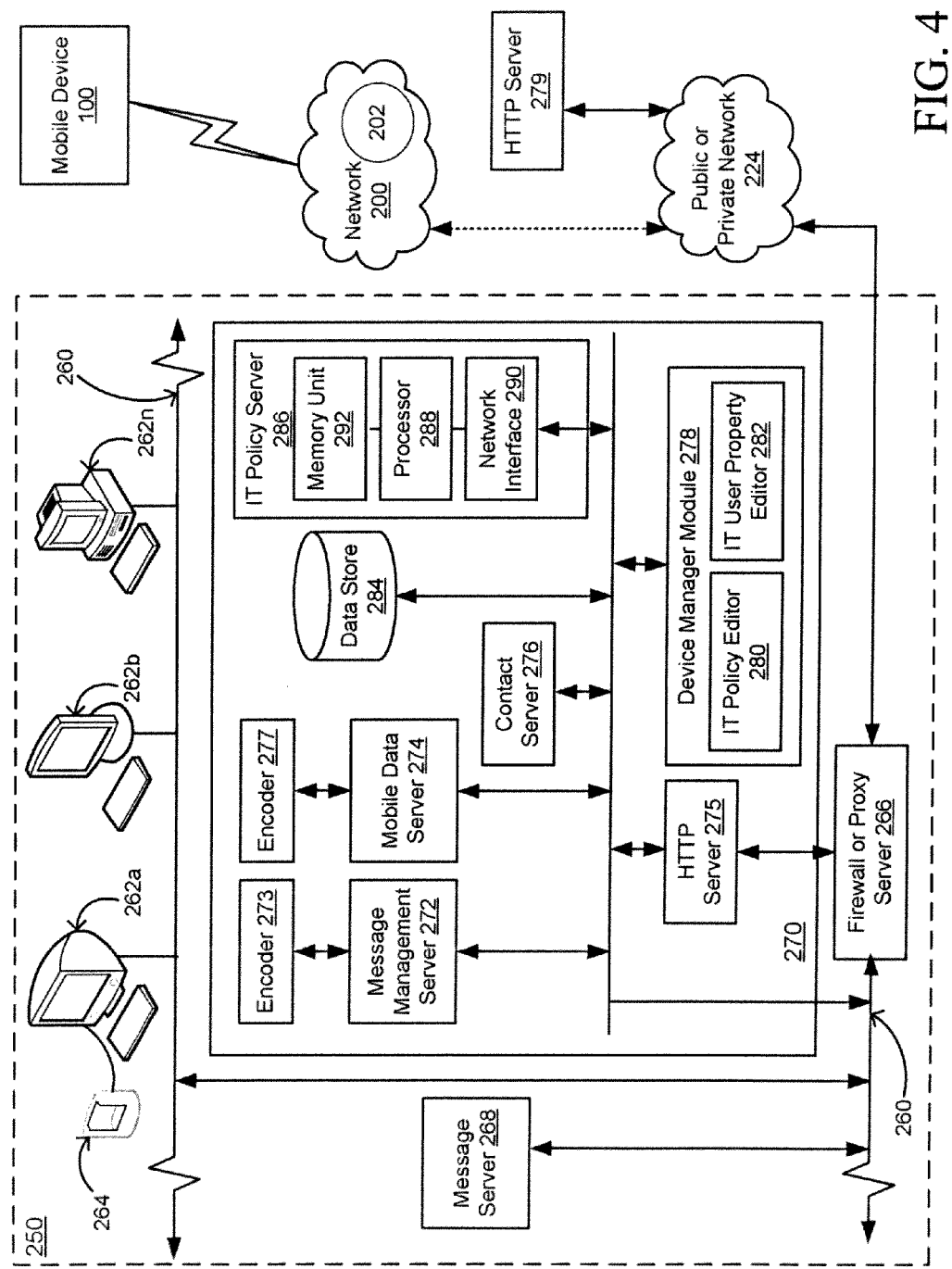
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, the short-range communications 122 and other device subsystems 124.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE, including Wi-Fi and Wi-Fi Direct.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection may be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262*a* can request the e-mail messages associated with that user's account stored on the data store associated with the message server 268. These messages are then retrieved from the data store and stored locally on the computer 262*a*. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

The communication device 100 may be a dual- or multiple-mode device configured to operate not only in voice-centric, but also data-centric networks. For example, the mobile device may be configured to communicate over a dual-mode network such as those identified above, including but not limited to CDMA, CDMA2000, GSM/GPRS, EDGE, EVDO, HSPA, HSPA+, UMTS, and LTE, and may also be configured to communicate over wireless networks that are typically IP-based, such as wireless LANs implementing the Wi-Fi protocol (one or more of the IEEE 802.11 suite of protocols), personal area networks implementing other protocols such as Bluetooth, other wireless networks implementing wireless broadband standards such as WiMAX (one or more of the IEEE 802.16 suite of protocols), and the like. The mobile device may also be configured to operate over a fixed connection to an IP-based network, for example via a USB or Ethernet connection. For ease of reference, these two modes are respectively referred to generally as cellular and LAN modes or networks, where LAN includes both wireless and wired LANs. Although the description herein is generally directed to an implementation on a mobile communication device typically communicating over networks over a wireless link, such as a 3G or 4G link, it will be understood by those skilled in the art that the description is not intended to be so limiting, and includes wired connections. The mobile device 100 may therefore be equipped with multiple interfaces and transceivers for communicating over different fixed and wireless networks, such as the communication subsystems 104 and 105, and may be configured to communicate over more than one network at a given time.

Figure 5:
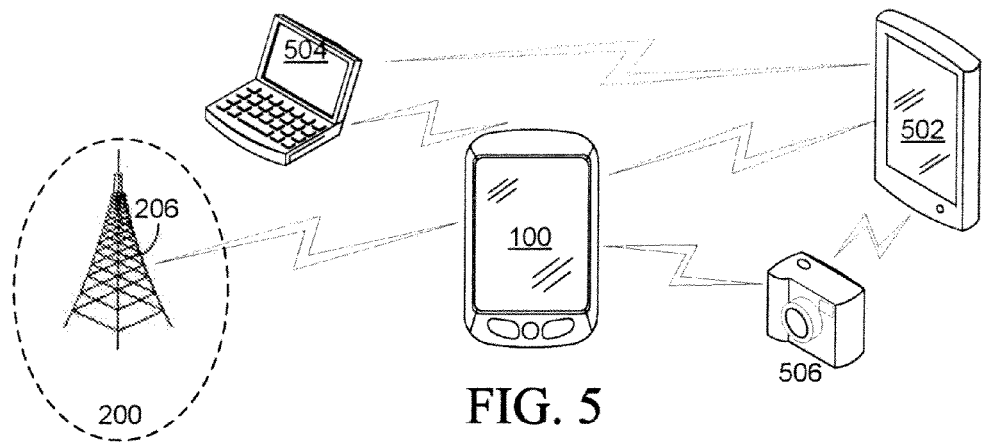
FIG. 5 is a schematic diagram of a possible network topology for the communication device of FIG. 1.

The communication device 100 may further be configured to operate as a router or access point for other communication or data processing devices in the vicinity of the device 100. For example, as shown in FIG. 5, the communication device 100 may operate as a router for a number of other devices configured to communicate wirelessly with the communication device 100. Alternatively, the communication device 100 and one or more other communication or data processing devices may be configured to automatically set up an ad hoc network, for example using the Wi-Fi Direct or another suitable protocol. In FIG. 5, an exemplary wireless-enabled tablet 502, laptop computer 504, and camera 506 are shown, each communicating with the communication device 100 over a wireless link. While only three wirelessly-enabled devices are shown communicating with the communication device 100 over wireless links, the communication device 100 may be capable of maintaining connections with fewer than three, or more than three other devices. Further, although each of the other devices 502, 504, 606 is shown communicating with the communication device 100 over a wireless link, one or more of these devices may be connected to the communication device 100 over a fixed connection, such as via the data port 114. Given space constraints, the communication device 100 may have limited data ports; other devices, such as the laptop 504, may be provided with a number of data ports to permit the other devices to be connected over a fixed connection. In addition, the other devices 502, 504, 506 may be configured to enter into ad hoc networks with another one of these devices, as reflected by the additional wireless links in FIG. 5.

The communication device 100 is in communication with a wireless network 200, including a tower station 206. The communication device 100 thus may have access to data services over a data-centric network, and through its operation as a router for the other devices 502, 504, 506, may provide these other devices with connectivity to the Internet or another wide area data network, using the wireless network 200 as a backhaul link. Operation in this mode may be referred to as providing a mobile "hotspot" for the other devices. When one or more of the devices 502, 504, 506 is brought within the vicinity of the communication device 100 while it is operating as a hotspot (or conversely, when the communication device 100 operating as a hotspot is brought within the vicinity of one or more of the devices 502, 504, 506), the device or devices 502, 504, 506 may connect to the communication device 100 (subject to any authentication or other security restrictions implemented by the communication device 100) and thereby access the wide area network.

Figure 6A:
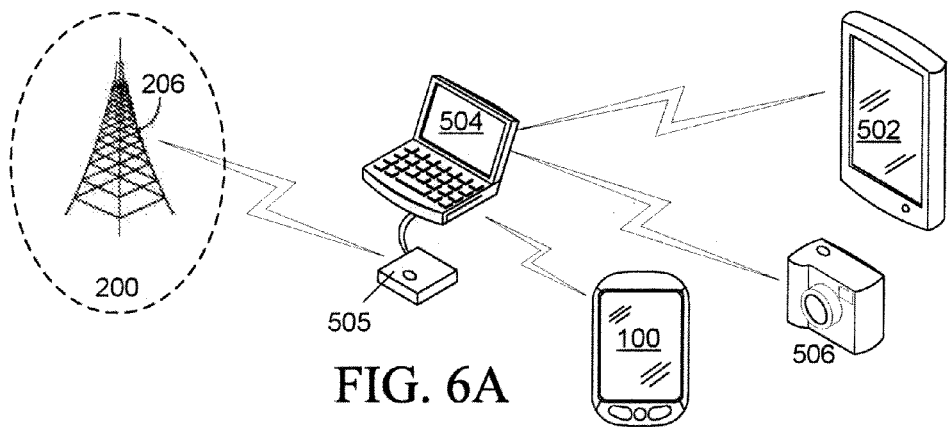
FIGS. 6A and 6B are schematic diagrams of further network topologies for the communication device.
Figure 6B:
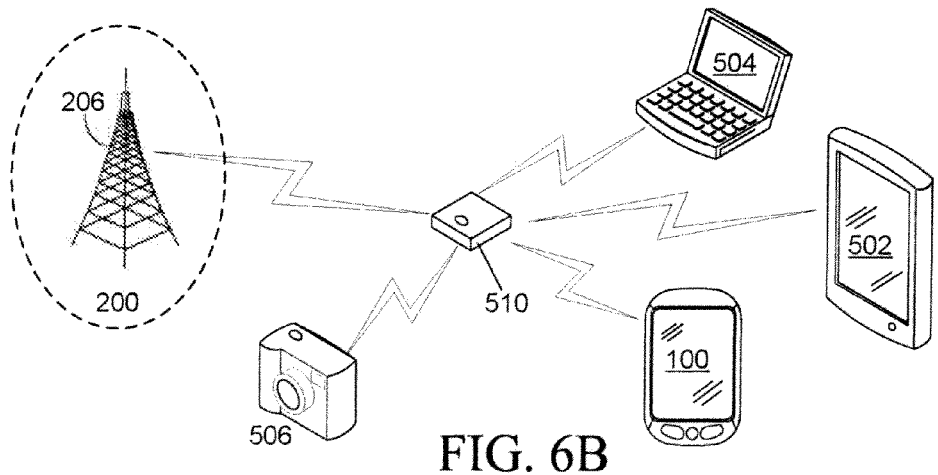

Another device, such as the laptop 504 or the tablet 502, may be similarly equipped to communication over the wireless network 200 and to provide WLAN or LAN connectivity to the other user devices 502, 504, 100 or 506, and may be used in place of the communication device 100. Alternatively, if the laptop 504 or tablet 502 is not provided with on-board wireless network or WLAN/LAN functionality, this functionality may be provided with an expansion card installed in the device 504, 502, or via a dongle or other external hardware device. Alternative network topologies are shown in FIGS. 6A and 6B. In the example of FIG. 6A, the laptop 504 may lack the required on-board hardware to communicate with the wireless network 200, so wireless network connectivity may be provided by means of a separate dongle or tethering device 505. In FIG. 6A, the tethering device 505 is connected to a data port of the laptop 504 by a fixed connection. The laptop 504 may be adapted to use its Wi-Fi chipset or other WLAN or LAN module to communicate with the remaining devices 100, 502, 506. Thus, the remaining devices 100, 502, 506 are provided with Internet connectivity over the wireless network 200 backhaul, via the laptop 504 and the external device 505. In an alternative embodiment of FIG. 6A, the communication device 100, which is configured to communication over the wireless network 200, may be tethered to the laptop 504 instead, in which case the external device 505 may not be needed.

In FIG. 6B, a mobile hotspot device 510 provides connectivity to the wireless network 200, and communicates over a WLAN with all of the devices 100, 502, 504, 506 wirelessly. The hotspot device 510 may provide Wi-Fi connectivity in particular, either in conventional or Wi-Fi Direct (peer to peer) mode, in which case it may be referred to as a mobile Wi-Fi hotspot device. The mobile hotspot device 510 may be provided in a compact form factor and be battery-powered, as it is intended to be easily transportable from place to place along with a mobile communication or data processing device. The hotspot device 510 may thus be limited in range or in the number of devices supported at a given time; for example, a typical hotspot device 510 (or the communication device 100 in FIG. 5, or laptop in FIG. 6A) may be limited to providing connectivity to up to five other devices. The hotspot device 510 may also be configured with few controls or user interface systems due to its limited size; the laptop 504, or another one of the devices 100, 502, 506 may be used to communicate with the hotspot device 510 for the purpose of configuring the operation of the device 510, such as configuring security features, filtering, and other functions. It will be appreciated by those skilled in the art that configuration of the device 510 will likely be handled using one of the communication device 100, the laptop 504, or the tablet 502, each of which is provided with sufficient user interface subsystems (such as keyboards, touchpads, and/or other data entry means) to permit a user to enter data to configure the hotspot device 100. Communication with and configuration of hotspot devices 510 and similar wireless routers in this manner will be understood by those of ordinary skill in the art.

With one of the network configurations shown in FIG. 5, 6A or 6B, the various devices 100, 502, 504, 506 may thus share Internet connectivity over the wireless network 200. Provided each of the other devices is configured to communicate with one device provided with access to the wireless network 200, and the device with wireless network access is configured to provide wireless (or fixed) router functions to the other devices with or without the use of a separate mobile hotspot device 510, it is not necessary for each of the other devices to be equipped for separate access to the wireless network 200, or for separate network accounts to be maintained for use with each of the other devices. The other devices may include laptops, tablets, and cameras as described above, but may also include other electronic communication or data processing devices that are configured for communication over a LAN or WLAN, whether intended for entertainment or productivity purposes. Other examples of suitable communication devices include audio and video players, gaming devices, navigation devices, e-book readers, personal organizers, and the like.

Many wireless network operators permit subscribers to "roam" from their home network (i.e. the home location at which the communication device 100 is registered for wireless service) to other network locations, which may be controlled by other operators. Thus, when a user of the communication device 100 travels from a geographical region served by the wireless network 200 to a region served by a different network operator, he or she may still be able to access data services with the communication device 100 through the wireless data services offered by the other network operator. If the communication device 100 also functions as a router or mobile hotspot for other communication and data processing devices, as described above, these other devices may continue to be provided with data service connectivity even while the user of these devices is travelling outside the home network.

Wireless network operators may also impose limits on the use of data services offered over their wireless networks, particularly in the form of data allowances or quotas (i.e., a limit on the quantity of data that may be transferred between the communication device 100 and the wireless network during a given billing cycle). If a user exceeds the usage limit, then the subscriber may be responsible for additional charges, which may come as a surprise to the subscriber if he or she is unaware of the quantity of data transferred via the communication device 100—particularly if other devices, such as the devices 502, 504, 506 shown in FIGS. 5, 6A and 6B have made use of the operator's data services via the mobile hotspot function or the mobile hotspot device 510. In some cases, the network operator may offer unlimited data services within the home network. However, outside the home network, while the communication device 100 or the mobile hotspot device 510 is in roaming mode, data charges may apply.

In addition, the user of the communication device 100 may wish to be able to control access granted to other devices 502, 504, 506 via the mobile hotspot function. If the mobile hotspot device 510 or communication device 100 is discoverable by other wireless-enabled devices in the vicinity, monitoring of connections will be required to ensure that unauthorized devices are not permitted access, particularly if the connection is not secured by an encryption key. Further, if other devices connect to the mobile hotspot device 510 or communication device 100 in an ad hoc network, the user of the communication device 100 and optional mobile hotspot device 510 providing the link to the broadband backhaul may not realize that the other devices are connected, or the quantity data transferred to and from those devices.

Therefore, a system and method for managing connections are provided. This system and method are first described in the context of the communication device 100 of FIG. 5, which operates as the mobile hotspot or router for the other devices 502, 504, 506 connected to the communication device 100.

Figure 7A:
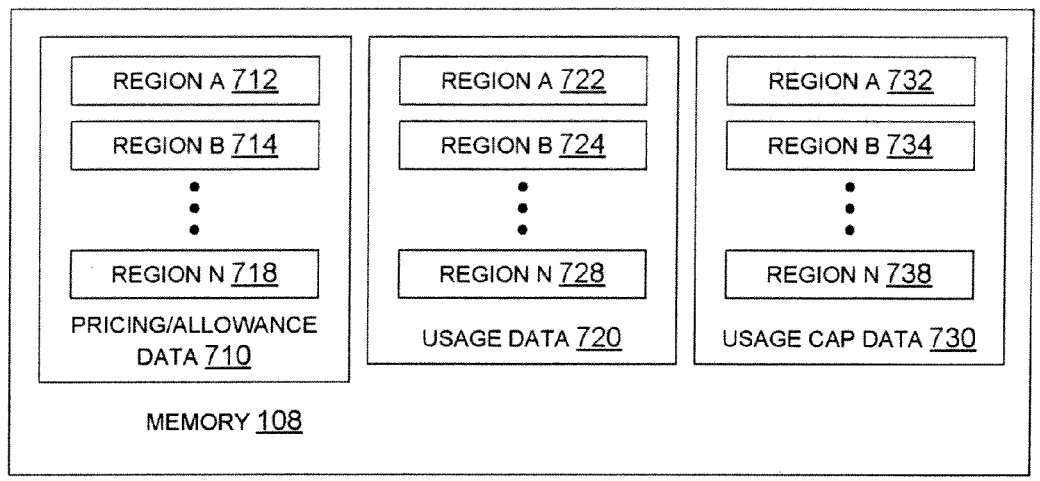
FIGS. 7A, 7B and 7C are block diagrams of a memory store at the communication device.

The communication device 100 may be configured to store data allowance and data service usage-related data in memory, such as the non-volatile memory 108. As shown in FIG. 7A, the memory 108 may store pricing and data allowance data 710, which may include the basic data allowances or limits imposed by the network operator's billing plan. In FIG. 7A, this data includes pricing data, which are the costs associated with data transfers over the basic data allowances, although in a simple embodiment only the data allowance information may be stored. The pricing and data allowance data 710 may be stored only for the home network associated with the communication device 100. However, if data services are available while the communication device 100 is roaming, it is useful to also store data allowance information, and optionally pricing information, for regions outside the home network. Thus, data 710 is shown in FIG. 7A as including pricing and allowance data for a "Region A" 712 and "Region B" 714, through "Region N" 718. Each region may represent a different network within the same region as the home network (typically a wireless network operated by a different operator, rather than a network implementing different wireless technology offered by the same operator providing the home network), a geographical region other than the region covered by the home network, possibly served by different networks and/or operators, or a group of geographical regions, countries or networks implementing an aggregate pricing and data allowance. The operator of the wireless network 200 may have entered into roaming agreements with a number of different network operators in different geographic regions, and may therefore establish data allowances and prices for its subscribers for each of these different network operators. In some cases, a data allowance and overage cost may be fixed by the network operator in respect of a group of countries or geographic regions, and the pricing and allowance may apply to the aggregate data service usage in that group of countries or regions. For example, the "Region A" data 712 may represent the data allowance and pricing of the communication device 100's home network. "Region B" 714 may represent a first group of countries, such that the data allowance fixed for that group applies to the total of all data service usage in all of the countries that are members of that first group.

This pricing and data allowance data 710 may be manually maintained by a user at the communication device 100. For example, the data 710 may be directly input into the communication device 100 by a user, or may be directly input into another communication device, such as a personal computer, with which the communication device 100 stores are periodically synchronized. Alternatively, the data 710 may be obtained over the air or over a wired connection from the IT policy server 286 or another component on the host system 250, or over the wireless network from an Internet server storing this pricing and data allowance information. Such a resource may be maintained by the wireless network operator of the wireless network 200. In a still further alternative, the pricing and data allowance information may be provided to the communication device 100 by the wireless network operator, for example as part of a billing update or other policy update delivered to the communication device 100.

The memory 108 may also store the usage data 720 for the data services used at the communication device 100. If the communication device 100 stores data in respect of multiple service regions, as described above, separate usage data may be stored for each separate region. Thus, in FIG. 7A, the usage data 720 includes "Region A" usage data 722, "Region B" usage data 724, and may include further data for other regions, as shown by "Region N" usage data 728. The usage data 720 may be obtained by the communication device 100 through a process or application executing on the communication device 100 for monitoring data transfer, or alternatively from the wireless network operator, either in a communication pushed from the network operator, or in response to a query transmitted from the communication device 100. Further detail concerning the acquisition of usage data is discussed below.

The communication device 100 may also store, separately from the pricing and data allowance data 710, usage cap or quota data 730. Even though a data allowance may have been established by the wireless network operator, it may be desirable to set a different practical quota or limit on data usage at the communication device 100—for example, the user may be willing to incur additional charges for exceeding the data allowance, and may therefore wish to set a different limit for the communication device 100. The usage cap data 730 may be manually configurable at the communication device 100, although permission to alter the usage cap data 730 may be restricted by an administrator of the host system 250 and the communication device 100. The usage cap data 730 may also be configured at the host system 250, for example at the IT policy server 286, and transmitted to the communication device 100. Again, this usage cap data 730 may be stored according to the applicable region, as different practical usage caps may be established for different regions. In FIG. 7A, there is shown "Region A" usage cap data 732 and "Region B" usage cap data 734. There may be usage cap data for a number of other regions, as indicated by "Region N" usage cap data 736.

Figure 7B:
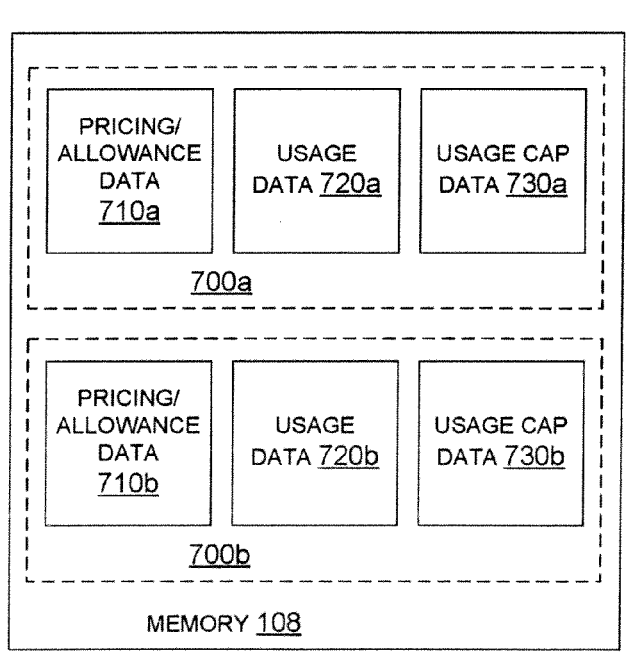

A user of the communication device 100 may possess more than one SIM/RUIM card 126 for use with the device 100. Each of these cards 126 may be associated with a different account with the same or a different wireless network provider, and may therefore be assigned its own corresponding data allowances and pricing plans. Accordingly, a similar set of data may be stored in the memory 108 for each additional SIM/RUIM card. FIG. 7B illustrates possible memory 108 contents where two SIM/RUIM cards are used for the communication device 100. A first set of data 700a, associated with a first SIM/RUIM card, includes pricing/data allowance data 710a, usage data 720a, and usage cap data 730a; a second set of data 700b associated with a second SIM/RUIM card includes corresponding pricing/data allowance data 710b, usage data 720b, and usage cap data 730b. In the various embodiments described below, data retrieved from the memory 108 will be retrieved from the data set 700a, 700b associated with the SIM/RUIM card currently in use on the communication device 100. Alternatively, the data 700a, 700b may be stored in memory on the SIM/RUIM card itself, provided sufficient memory capacity is available on the card.

Figure 8A:
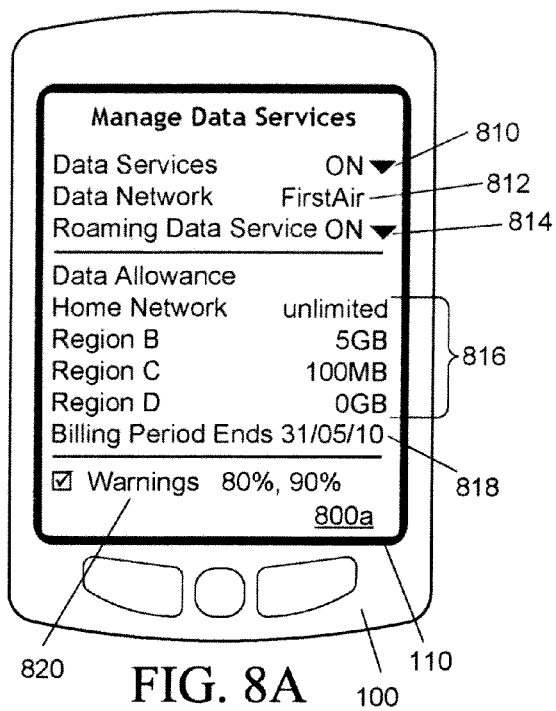
FIGS. 8A through 8D are examples of user interfaces for managing data services at the communication device.

With the data stored in the memory 108 illustrated in FIG. 7A, the communication device 100 may be configured to manage connections by other devices to the communication device 100, and data services accessed via the communication device. FIGS. 8A through 8D show examples of user interfaces that may be displayed at the communication device 100 for managing the data services available to the communication device 100 from the wireless network 200. FIG. 8A illustrates a first user interface 800a, which provides information concerning the data services available to the communication device 100. A first setting 810 indicates whether the data services are available at the communication device 100. In FIG. 8A, the value of the setting 810 is set to "ON", i.e., the wireless network operator's data services are available to the communication device 100, at least while the communication device is in its home network. The value of the setting may be altered via the user interface, for example to "OFF" so as to disable data services at the communication device 100.

Another setting 812 identifies the current network operator providing the data services. While the value of this setting 812 may not be alterable by the user, other configuration functions at the communication device 100 may be used to select an alternative network provider (not shown). A further setting 814 indicates whether data service is available while the communication device 100 is roaming (i.e., connected outside its home network). In the example of FIG. 8A, this roaming data service is "ON", meaning that the communication device 100 is able to access the data services of another wireless network while in roaming mode. The value of this setting may be altered via the user interface to terminate roaming data access. In one embodiment, the value of the roaming data service setting 814 may be set at the host system 250, for example in an enterprise policy provided by the IT policy server 286. Further, alteration of this setting via the user interface of the communication device 100 may be disabled, so that only an administrator or another person with sufficient privileges at the host system is able to alter the setting 814. For example, it may be an enterprise policy to deny access to data services while the communication device 100 is roaming. Disabling alteration of the setting 814 thus prevents a user of the communication device 100 from circumventing this policy. If multiple SIM/RUIM cards 126 are used with the communication device 100, different enterprise policies may be applied for the different cards 126.

The user interface 800a also provides information concerning data allowances for one or more regions or networks, according to the data allowances information 710 stored at the communication device 100. A listing 816 identifies a number of wireless networks accessible by the communication device 100, when the communication device 100 is located in the relevant geographical region, and their corresponding data allowances, as set by the wireless network operator. It can be seen in FIG. 8A that for the communication device 100's home network, there is an "unlimited" data allowance, meaning that no excess charges may be incurred for data transfers using the data services of the wireless network 200 so long as the communication device 100 is within the range of that network 200, and not roaming. For another region, Region B, a data allowance of 5 GB is indicated, meaning that once data transfers using a data service while the device 100 is served by a network in Region B exceed 5 GB, excess data transfer charges may be levied. The user interface 800a also indicates when the current billing cycle ends 818 for the communication device 100 subscription, since data allowances are typically defined for a single billing cycle, and any data usage from a previous billing cycle is reset to zero once a new billing cycle begins. Finally, FIG. 8A also includes warnings setting 820, which may be used to set a threshold for issuing a warning once data usage has reached that threshold.

Figure 8B:
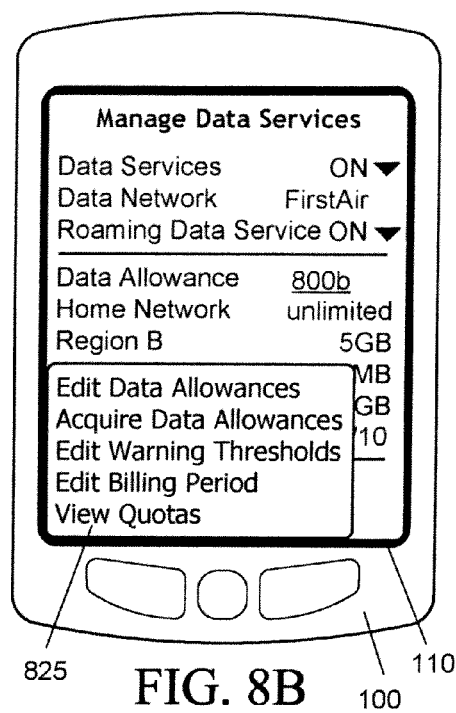

Some or all of the information displayed in the user interface 800a may be editable at the communication device 100. FIG. 8B illustrates an example of a user interface 800b similar to 800a, but including an overlay window 825 comprising a number of options selectable via an interface subsystem on the device 100. This overlay window 825 may be invoked as a result of a detected command or instruction at the communication device 100, such as a keypress on a keyboard or keypad, a tap or gesture on a touchscreen display, and the like. As can be seen in FIG. 8B, the overlay window 825 provides the options of editing or acquiring the data allowances 816, editing the warning thresholds 820, and editing the billing period information 818. In addition, the overlay window 825 includes an option to view "quotas". Upon selection of one of these options and invocation of a command, the communication device 100 may present a new user interface for the editing or input of data relevant to that option.

Figure 8C:
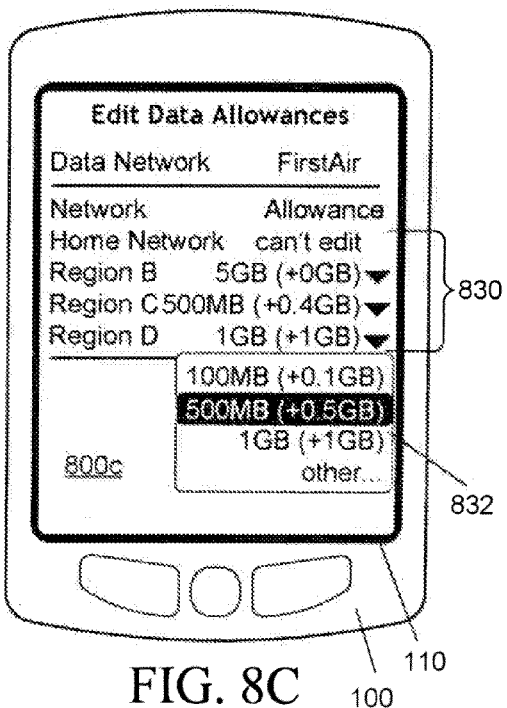

FIG. 8C is an example of a further user interface 800c for editing the data allowance information. As noted in the above discussion of FIG. 7A, this data may be acquired from the wireless network operator, or alternatively it may be directly entered either at the communication device 100 or the host system 250. Also as noted above, it may be desirable to fix a different practical usage cap on data usage for one or more regions. Thus, the user interface 800c may be used to set a different usage cap in excess of, or lower than, the predetermined data allowance fixed by the wireless network operator. In FIG. 8C, a listing of data allowances 830 is provided in the user interface 800c. The data allowances indicated in this particular example are shown both as an absolute value (e.g., 500 MB for Region B) as well as an increment (or decrement) from the network operator's predetermined data allowance (e.g., +0.4 GB for Region B, indicating that the data allowance set in the listing 830 is now 0.4 GB or 400 MB greater than the data allowance fixed by the network operator). Thus, with reference to FIG. 7A, either the absolute value or the increment (or decrement) may be stored as the usage cap data 730. In the listing 830, the data allowance for the home network is indicated as "can't edit" since the data allowance for the home network, as can be seen in FIG. 8A, is unlimited; it is therefore unlikely that a different cap or data allowance would need to be set.

In this user interface, an entry in the listing 830 may be selected for editing, which in this embodiment invokes a drop-down list 832, providing a series of possible increments (or decrements) for selection. Upon detection of a selection of one of the listed increments (or decrements), the usage cap data 730 and the listing 830 in the user interface 800c may be updated accordingly. As noted above, certain settings may not be alterable at the communication device 100, if an enterprise policy has been set to prevent the user from altering certain settings; thus, in some embodiments, the drop-down list 832 may not be invocable.

Figure 8D:
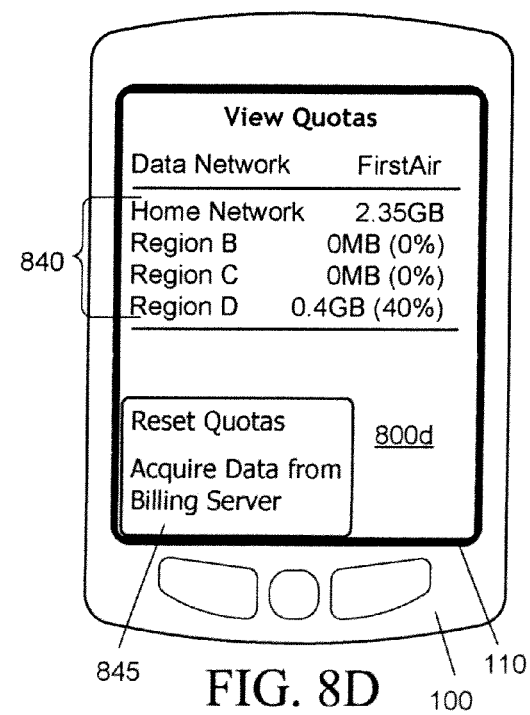

Another option listed in the overlay 825 of FIG. 8B is to "view quotas". FIG. 8D provides an example of a further user interface 800d displaying the current usage statistics for the various regions in which the device 100 is able to access data services. As can be seen from the listing 840, 2.35 GB of the data allowance available for the home network has been used in the present billing cycle, zero percent of the data allowance available for Regions B and C, and 40% of the allowance for Region D. A context menu may be invocable in this view, displaying options to either reset the quotas (i.e., reset the usage statistics displayed in the listing 840 to zero), or to acquire current usage data from the wireless network operator ("acquire data from billing server"). As noted above, data transfer may be monitored at the communication device 100. This monitoring may be carried out in real time. However, the network operator may maintain its own records concerning data usage for all regions, and may provide this data to the communication device 100 in response to a request, or as part of a periodic update transmitted to the communication device 100. If usage data is obtained from the network operator, this usage data may replace the current usage data 720 stored at the device 100.

Figure 9:
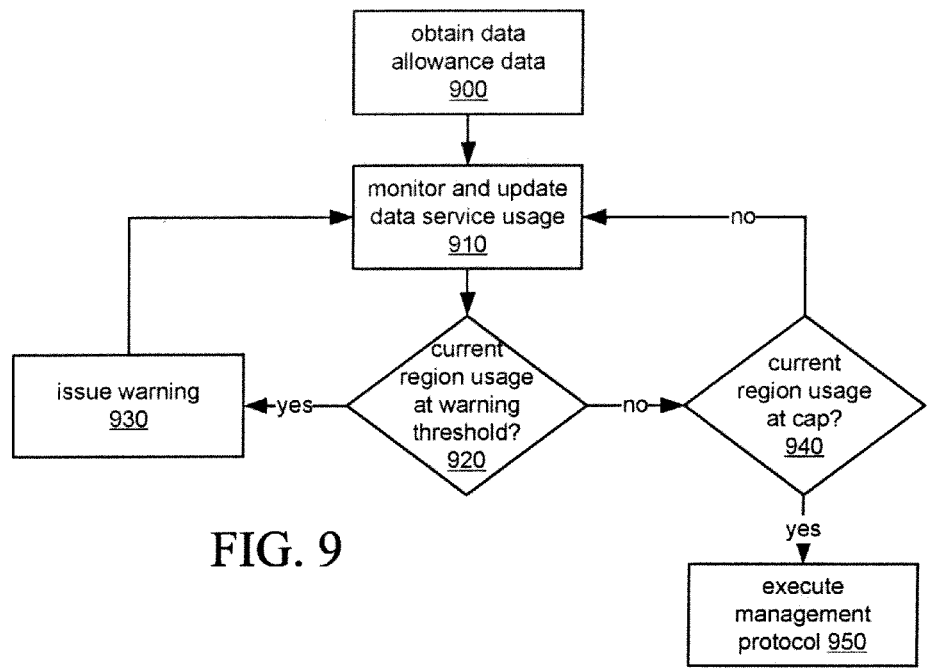
FIG. 9 is a flowchart illustrating a method for managing data services at the communication device.

A method for managing a mobile hotspot connection and other data service usage at the communication device 100 is illustrated in FIG. 9. At 900, data allowance information is obtained at the communication device 100. Usage of data services is then monitored by the communication device 100 at 910. Data transfer using the data services may be carried out through an application or other process at the communication device 100 accessing the data services for use at the communication device 100, or through the communication device 100 transferring data to and from the wireless network 200 (or a visited network, if the communication device 100 is roaming) while functioning as a router or mobile hotspot to provide network connectivity to other devices, such as the devices 502, 504, 506 of FIGS. 5, 6A and 6B. Usage monitoring may be carried out locally, at the communication device 100, or alternatively by the wireless network operator and provided to the communication device 100, as described above. It will be noted, however, that the network operator may not provide usage data to the communication device 100 on a sufficiently frequent basis to keep the usage data 720 at the communication device 100 sufficiently up to date to ensure that the data allowances or usage caps set at or for the device 100 have not been exceeded. Thus, even if the communication device 100 relies on the network operator pushing data usage information to the device 100, it may be useful for the communication device 100 to also monitor data transfers itself, or to periodically query the network operator for updated usage data, particularly if a number of devices 502, 504, 506 are concurrently connected to the communication device 100 and making use of the router or hotspot function, or if a large amount of data is currently being or has recently been transferred between the communication device 100 and the wireless network 200.

Since the data allowances may differ by region, the data usage information is recorded in respect of each individual region (as illustrated by FIG. 7A). If the communications device 100 receives usage data from the network operator, then the usage data provided by the network operator may indicate to which region the usage data applies. However, if the communication device 100 monitors the data usage itself, the device 100 may need to determine for itself whether it is in roaming mode or not, and in which region it is currently roaming, so that it can both record its monitored usage data against the appropriate region in the memory 108, and determine whether it has reached a warning threshold or a data allowance or cap for that region. Thus, the device 100 may periodically query the network to which it is connected to obtain an alphanumeric identifier for comparison to an identifier stored at the communication device 100 (e.g. on the device's SIM/RUIM card 126). If the received identifier is determined to match the stored identifier, then the device 100 may determine that it is not roaming. Alternatively, in a GSM-type network, the communication device 100 may query the network for an identifier for the cell tower with which it is in communication, and then compare a portion of this identifier, which may include a country code, with a corresponding portion of the communication device 100's IMSI. If there is a match, then the communication device 100 may determine that it is not roaming; if it does not match, the communication device 100 may be able to identify which region it is in for the purpose of monitoring data usage. Similarly, in a CDMA or CDMA2000-based network, the communication device 100 may obtain the network's system ID (SID) or network identification number (NID) if available, and use the SID or NID to determine whether the device 100 is within its home network or roaming. In a further embodiment, the communication device 100 may use GPS or another geolocation service implemented at the device 100 to determine where it is located, so that it may determine which region it is in. However the device 100 may track the commencement or termination of roaming, a monitoring or listening process may be maintained at the communication device 100 to receive notifications from a tracking module indicating when the device 100 is in roaming mode and where, and/or receive notifications from a geolocation function implemented at the device identifying the device's current location, to assist in maintaining and updating the usage data 720.

At 920, it is determined whether the current data usage for the current region is at a warning threshold, if a warning threshold level had been set (for example, as shown in FIG. 8A, two different threshold levels have been set). If a warning threshold has not been reached, and the cap or allowance for that region has not yet been reached as determined at 940, then the process returns to 910. If a warning threshold has been reached, then a warning may be issued at 930. This warning may be a notification displayed at the communication device 100, such as the notification 1010 shown in FIG. 10A. The notification may overlay any current user interface displayed at the device 100, such as the user interface 1000a. The notification may be dismissed from the display 110 of the communication device 100, for example through actuation of the "OK" button 1012, or actuation of the "manage Wi-Fi connections" button 1014, which invokes a new view displayed at the communication device 100 for managing the devices connected to the device 100 over a Wi-Fi connection (or other LAN or WLAN connection). In the meantime, the communication device 100 may continue to monitor and update usage data for that region. If a further threshold is determined to have been reached at 920, then again a warning may be issued at 930.

Figures 10A, 10B:
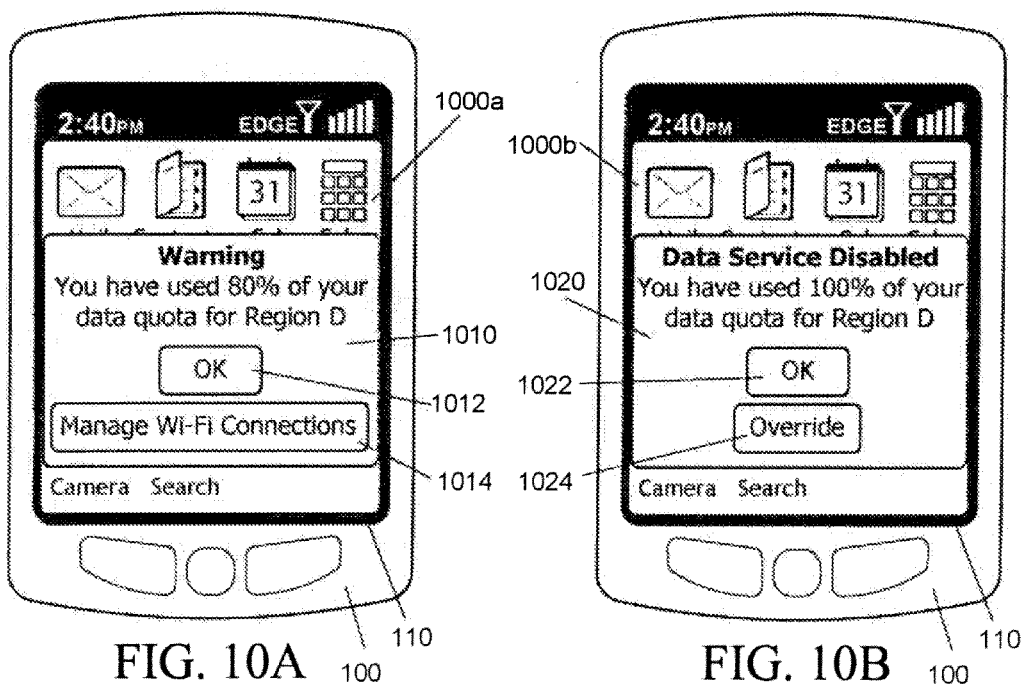
FIGS. 10A and 10B are examples of user interfaces for handling quota warning and exhaustion events.

If it is determined, on the other hand, that the cap or quota for data transfer for the current region has been reached, then at 950 a management protocol is executed. This management protocol may simply comprise disconnecting any devices 502, 504, 506 currently making use of the router or hotspot function, or disabling data service altogether, until either the billing cycle starts over, the data allowances stored on the device 100 are reset, or the management protocol is overridden, either by the user of the communication device 100 or an administrator or other person with sufficient privileges at the host system 250. FIG. 10B illustrates an example of a notification 1020 that may be displayed at the communication device 100 as part of the management protocol. This notification 1020 indicates that data services have been disabled because 100% of the data allowance for the current region, here Region D, has been used. The notification 1020 may be dismissed by actuating the "OK" button 1022, or alternatively a device management or data services management view, such as the user interface 800c, may be invoked through actuation of the "override" button. Again, as noted above, the ability to override the data allowances may not be permitted, depending on the enterprise policies set for the communication device 100.

Figure 11A:
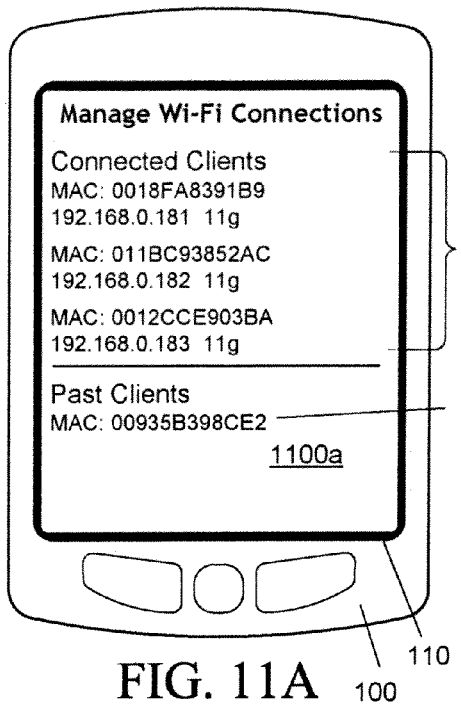
FIGS. 11A through 11C are examples of user interfaces for managing device connections at the communication device.

In addition to managing device services as discussed above with respect to FIGS. 8A to 8D, the devices connecting to the communication device 100 may also be managed. Turning to FIG. 11A, a first user interface 1100a is shown for managing wireless clients connected to the communication device 100 through a Wi-Fi link. The same, or a similar user interface, may also be used to manage wired connections with other devices. The user interface 1100a includes a listing of currently connected client devices 1110, and a list of previously connected clients 1112. This data may be stored in the memory 108. It will be appreciated that the previously connected clients need not be displayed for the purpose of managing current connections, although the identification of previously connected clients may be useful for prioritizing access to the router or hotspot function of the communication device 100, as discussed below. The listings 1110, 1112 of clients may include the MAC address as a unique identifier, as well as the assigned IP address, the protocol type (e.g. "11g" for 802.11g). Other information, such as the time the client joined, the duration of the connection, and any "friendly" name or identifier for the connected devices, may also be stored in the memory 108.

Figure 11B:
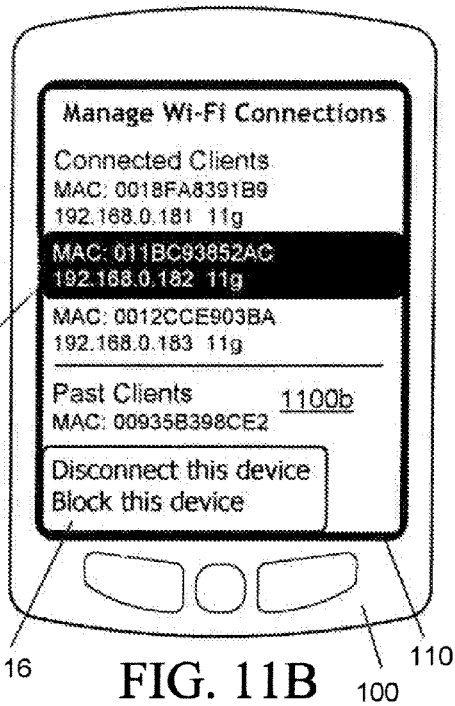

Connections of devices shown in the listing 1110 may be managed through this user interface. As shown in FIG. 11B, the user interface 1100b shows that a context menu 1116 may be invoked for a selected on 1114 of the listed clients. The context menu 1116 provides the options of either disconnecting the device (in the case of a currently connected device), or blocking the device from connecting to the communication device 100. For past clients, the context menu 1116 may also provide for deletion of the client information from the memory 108.

Figure 11C:
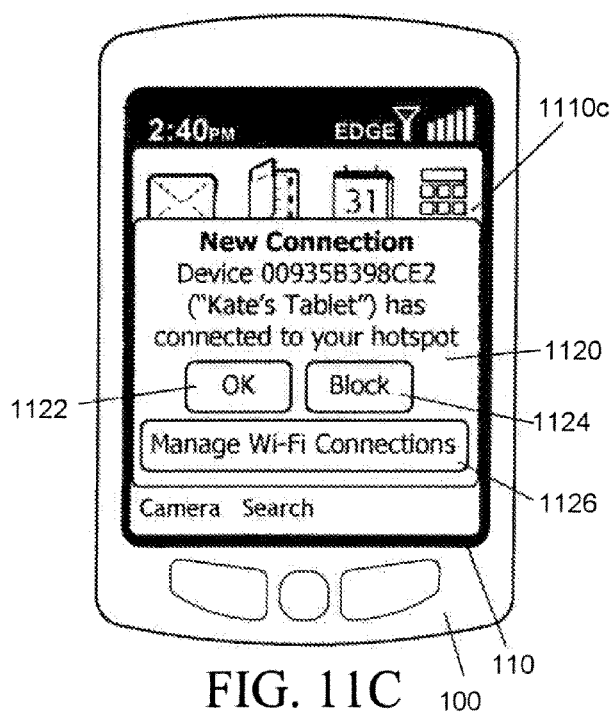

When a new device 502, 504, 506 connects via the Wi-Fi or other LAN or WLAN link, a notification is displayed at the communication device 100 to alert the user of the new device. As shown in FIG. 11C, this notification 1120 overlays the current user interface 1100c displayed at the device 100, identifies the newly-connected device, and provides options to accept the connection (i.e., dismiss the notification) 1122, block the device from connecting 1124, or to invoke a device management view 1126. The device management view may be the user interfaces shown in FIG. 11A or 11B.

Figure 12A:
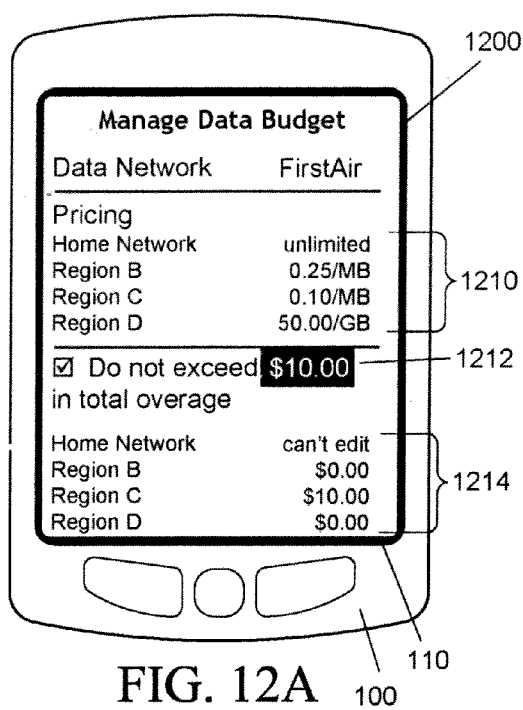
FIG. 12A is an example of a further user interface for managing data services at the communication device.

Data services may be managed at the communication device 100 according to a predetermined budget, rather than by data quantities. For example, an alternative means for setting data allowances is shown in FIG. 12A. The user interface 1200 of FIG. 12A provides a listing 1210 of pricing data for the regions in which data services area available for the communication device 100. This pricing data may be drawn from the pricing/allowance data 710, shown in FIG. 7A. In this example, the data allowance for the home network is unlimited, so no pricing information is provided (instead, the listing 1210 indicates this is "unlimited"); prices in dollars per megabyte or gigabyte are shown for the other regions. As mentioned above, this data may be provided by the wireless network operator, for example during an update transmitted to the communication device 100; alternatively, this data could be provided to the device 100 from the host system 250, or retrieved over the wireless network 200 from a server on the Internet. The user interface 1200 also provides the option of fixing a single limit value for any data transfers at 1212. This single limit may be expressed as a dollar value. If this option is enabled (in the example of FIG. 12A, the option is enabled by checking the checkbox associated with the option), then regardless of whether the communication device 100 is roaming or within the home network, any data transfers in excess of the predetermined data allowance established by the network operator are capped at a fixed amount. This fixed amount is an aggregate amount for all regions. Thus, for example, if the limit is $10, the user may travel first to Region B and exceed the basic data allowance provided by the network operator by 20 MB, which is equivalent to $5 according to the pricing data 1210, and will be left with a further $5 to "spend" on data transfers during the same billing cycle. There is thus no need to establish a usage cap for each individual region or to store the associated data in the memory 720; it is sufficient to simply track the equivalent cost of data services and to store a single dollar value in the memory 108.

Figure 12B:
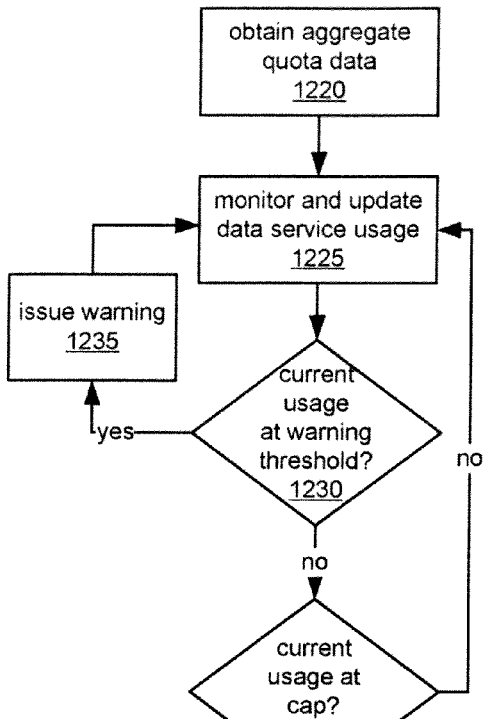
FIGS. 12B and 12C are flowcharts illustrating further methods for managing data services at the communication device.

A method for implementing this cap is shown in FIG. 12B. At 1220, the aggregate quota or cap is obtained (i.e., the limit value of option 1212). At 1225, the communication device 100 monitors and updates data usage in a manner similar to that described above; however, in this embodiment, the data usage is converted to a dollar value based on the pricing data available to the communication device 100. Similar to the method of FIG. 9, warnings thresholds may be instituted (e.g., at 80% and/or 90% of the cap). Thus, at 1230 it is determined whether the current data usage is at a warning threshold. If it is not, and the current data usage has not reached the cap at 1240, then the process continues to monitor and update data usage at the device 100. If it is determined at 1230 that a warning threshold has been reached, then at 1235 a warning may be issued, in a manner similar to that described in respect of FIGS. 9 and 10A. If it is subsequently determined that the current usage has reached the cap (i.e., the cost of data usage has reached the limit fixed in option 1212), then at 1245 a management protocol is executed. This management protocol may be similar to the protocol described above.

The user interface 1200 of FIG. 12A also illustrates an alternative means of setting a budget for data transfers. Listing 1214 provides a list of the networks accessible to the communication device 100 including data services with corresponding dollar values. A dollar value may be established for each of the regions identified in the listing 1214. Again, with respect to the home network, the listing indicates that the dollar value cannot be edited, since the data allowance for the home network is unlimited. Also, as noted above, these values may be editable at the communication device 100, although in other embodiments an enterprise policy may prevent these values from being edited at the device 100, while they may be editable at the host system 250.

Figure 12C:
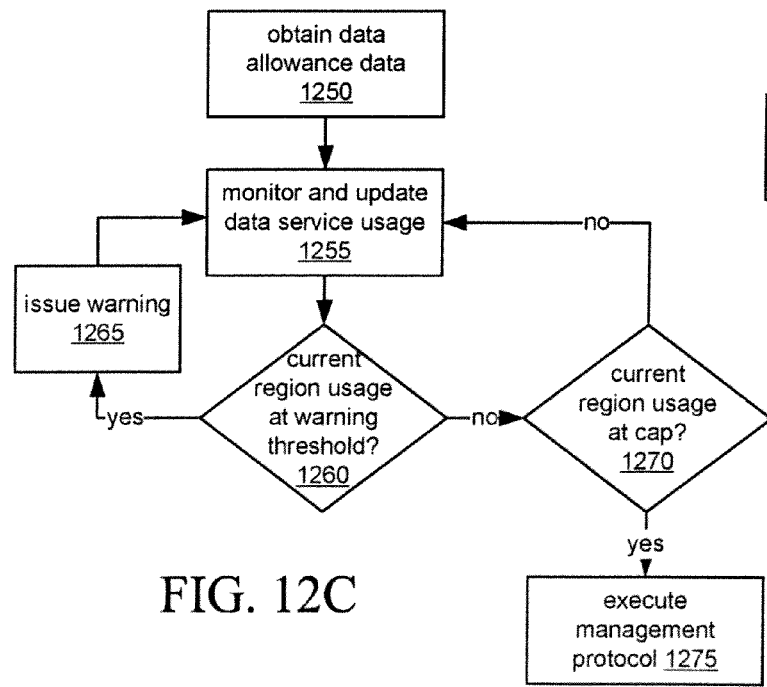

The dollar values thus reflect the quantity of data that may be transferred over and above any predetermined data allowance set by the network operator. Thus, they effectively operate in a similar manner to the data allowances set in FIG. 8C or applied in FIG. 9. Turning to FIG. 12C, at 1250 data allowance information is obtained at the communication device 100. This data allowance information may be the dollar figures set out in listing 1214. Usage of data services is then monitored by the communication device 100 at 1255. Data transfer using the data services may be carried out and monitored as described above with respect to FIG. 9. The usage data is also stored in respect of each region. At 1260, it is determined whether the current data usage for the current region is at a warning threshold, if a warning threshold level had been set. If a warning threshold has not been reached, and the cap or allowance for that region has not yet been reached as determined at 1270, then the process returns to 1255. If a warning threshold has been reached, then a warning may be issued at 1265. In the meantime, the communication device 100 may continue to monitor and update usage data for that region. If a further threshold is determined to have been reached at 1260, then again a warning may be issued at 1265.

If it is determined, on the other hand, that the budget for data transfer for the current region has been reached, then at 1275 a management protocol is executed. As before, this management protocol may simply comprise disconnecting any devices 502, 504, 506 currently making use of the router or hotspot function, or disabling data service altogether, until either the billing cycle starts over, the data allowances stored on the device 100 are reset, or the management protocol is overridden, either by the user of the communication device 100 or an administrator or other person with sufficient privileges at the host system 250.

Figure 13A:
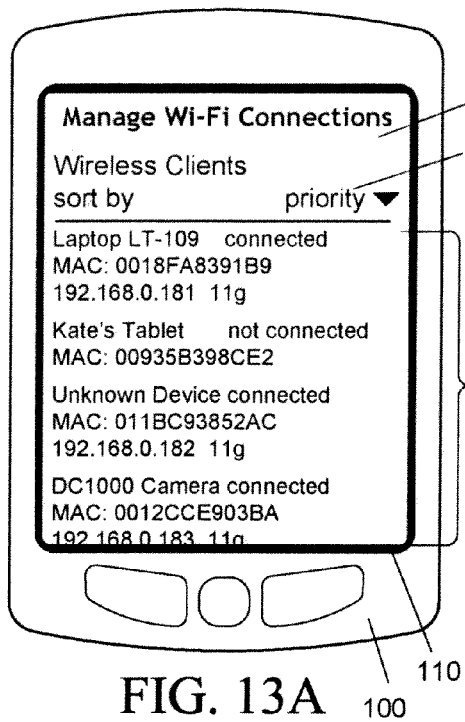
FIGS. 13A and 13B are further examples of user interfaces for managing device connections at the communication device.
Figure 13B:
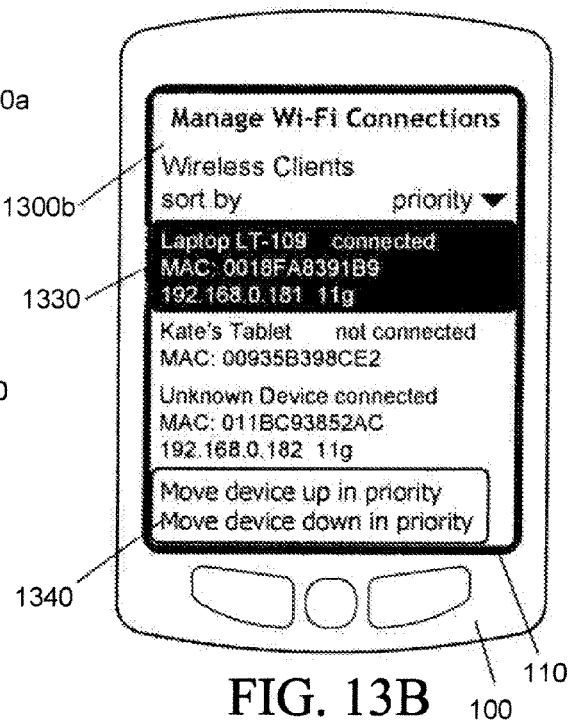

In still a further embodiment, device connections at the communication device 100 may be prioritized. This prioritization may be applied in the management protocol employed to handle situations where a warning threshold has been reached, or data usage has reached the cap or data allowance for that region. FIG. 13A illustrates a further user interface 1300a, in which the client devices (e.g. the devices 502, 504, 506) connected to the communication device 100 are listed in order of priority. This priority may be set by a value at the communication device 100, or in an enterprise policy transmitted to the communication device 100 from the host system 250. The priority listing includes not only those devices that may be currently connected to the communication device 100 as shown in the listing 1320, but also those devices that were previously but are no longer connected. The priority listing may be organized in order of decreasing priority, with the most important devices listed first, and least important devices last. FIG. 13B illustrates a further user interface 1300b in which a selected one of the entries in the listing 1320 has been highlighted at 1330. A context menu may be invoked through a user command at the device 100. In this example, the context menu provides the option of moving the selected device up or down in the list. Thus, by selecting all the devices necessary in turn, the list of currently and formerly connected client devices can be arranged in order of priority.

Even in the absence of data allowance considerations, this prioritization may be used to generally control access to the communication device 100 or mobile hotspot device 510 when a limited number of connections to the device 100 or 510 are available. For example, if there is a limit of five connections, all of which are used by external devices such as 502, 504, and so on, a request from another device having a higher priority than one of the currently connected devices may result in the lower-priority currently connected device being disconnected from the communication device 100 or hotspot device 510 and the higher-priority device being permitted to connect in its place. In this manner, the user is able to prioritize and manage connections to the device 100 or 510 in advance, without waiting for a device to request a connection before making a determination whether a currently connected device should be disconnected.

Figure 13C:
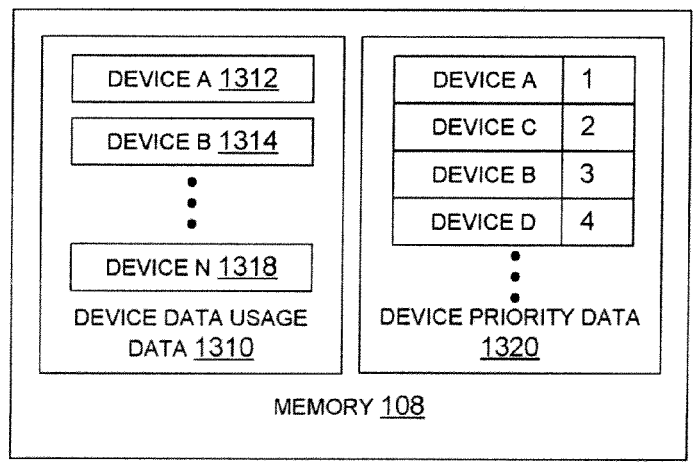
FIG. 13C is a further block diagram of a memory store at the communication device.

Data pertaining to the order of priority may also be stored in the memory 108, for example as a numerical value, as shown in FIG. 13C. In addition to the data illustrated in FIG. 7A, the memory 108 may also store usage data 1310 for each individual device connecting via the router or hotspot function, as shown by data items 1312, 1314, and 1318. The memory 108 may also store the priority data for each of these devices 1320.

Figure 14A:
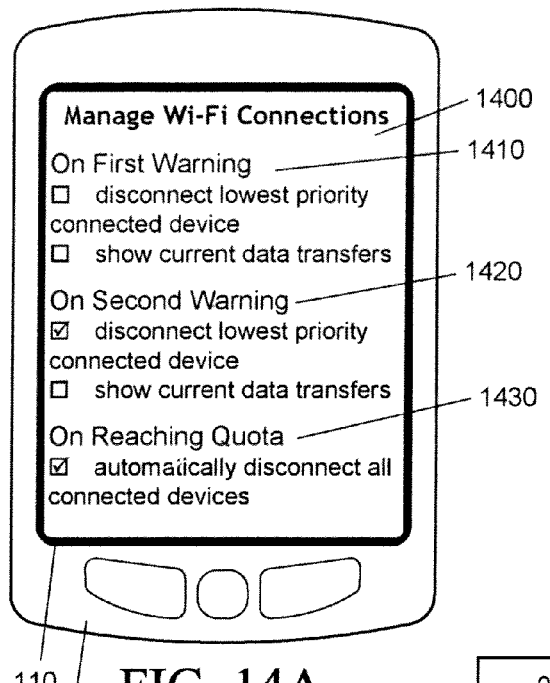
FIG. 14A is still a further example of a user interface for managing device connections at the communication device.
Figure 14B:
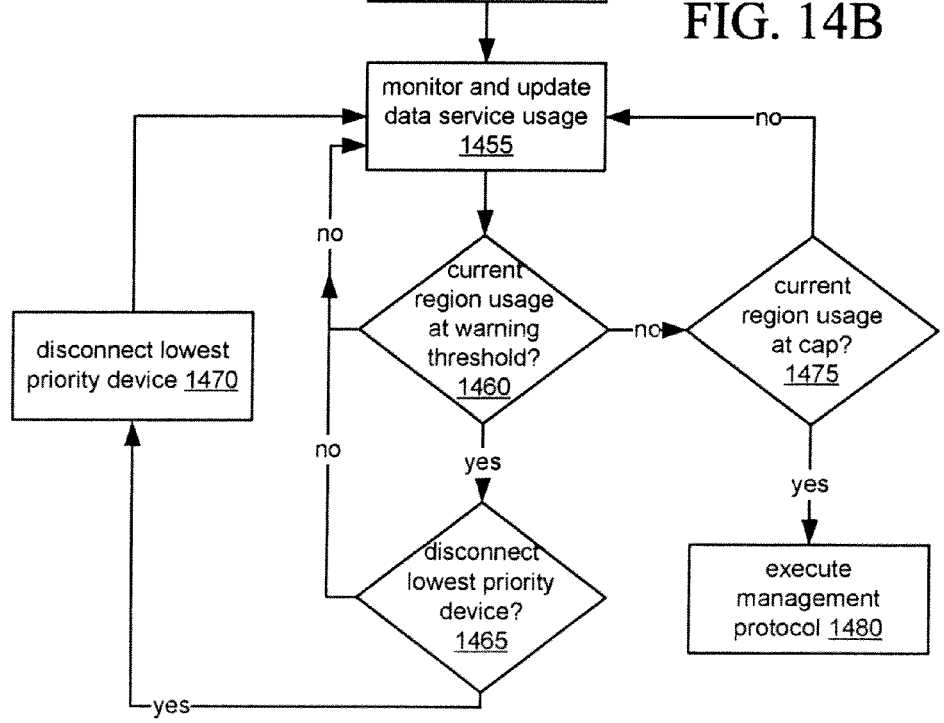
FIG. 14B is a further flowchart illustrating a method for managing data services at the communication device.

FIG. 14A illustrates a view for configuring the management protocol to be implemented when warning thresholds or data allowances are reached. The user interface 1400 of FIG. 14A includes an option for setting actions for a first warning 1410, a second warning 1420, and upon reaching quota (i.e. reaching the data allowance set at the communication device 100) 1430. In the example of FIG. 14A, the possible options for handing the first and second warnings include disconnecting the lowest priority device that is currently connected to the communication device 100. Disconnecting a currently connected device may assist in slowing down the rate at which the data allowance is being consumed. The options also include an option to display at the device 100 any available information about current data transfers that are ongoing, as the user may wish to manually discontinue one or more of them. Thus, turning to FIG. 14B, a method for implementing this management protocol is shown. At 1450, data allowance information is obtained for the device. At 1455, the data usage at the communication device 100 is monitored and updated as described above. At 1460, it is determined whether the data usage has reached a warning threshold. If it has not, the process continues to monitor data usage. If the data usage has reached one of these threshold values, then at 1465 it is determined whether a management step should be implemented, such as disconnecting the lowest priority connected device from the communication device 100. If this option has not been selected for this threshold (for example, in FIG. 14A, the option of disconnecting the lowest priority device at the first warning threshold is not enabled), then the process continues monitoring data usage at 1455. If, however, the management step should be implemented, then at 1470 the lowest priority device currently connected to the communication device 100 is identified and disconnected. The process then continues to monitor data usage at 1455.

If it is determined at 1475 that the current data usage has reached the cap or predetermined data allowance, then at 1480 the appropriate management protocol is invoked. Referring again to FIG. 14A, in this embodiment the management protocol is to automatically disconnect all currently connected devices. Thus, at 1470, all devices are disconnected from the router or hotspot function provided by the communication device 100 and the mobile hotspot or routing feature is disabled at the device 100 until such time that the usage data is reset, the data allowances are overridden, or the billing cycle ends and a new one begins.

From time to time, new data allowance data may be required at the device 100 for the purpose of real-time monitoring, since roaming agreements between the home network and roaming network operators may change, or data plans offered by operators may change. Thus, FIG. 15 illustrates a simple method by which new data allowance information may be applied at the device 100. At 1500, new data allowance data is received. At 1505 it is determined whether an effective date for applying the new data allowance data has been provided; for example, the operator may provide advance notice of a change in data service rates. If no effective date is provided or if the effective date has passed, then the new data allowances are applied immediately at 1515. If a future effective date is provided, then the device 100 may store the data allowance data in the memory 108 until the effective date arrives, then apply the data allowance data in respect of the particular network or roaming information stored at the device 100.

As noted above, usage data delivered by the network operator to the device 100 may not be current. For example, the roaming agreements entered into between the home network operator and the roaming network operators may not only provide for different data allowances, but may also provide for different reporting periods. Thus, if the user of the device 100 travels across different regions and uses data services while roaming, by the time updated data usage information in respect of the home network becomes available (for example, at the end of a billing period), there may not be updated roaming data usage information available. While the device 100 may monitor data services usage itself, despite the storage of roaming data allowance information there may be some inherent uncertainty whether data usage during certain periods should be allocated to a current home network billing period or to a future billing period. In addition, even if a reporting period for a roaming network is defined at the device 100 and the device 100 monitors data usage over that roaming network, it may not be known at the device 100 whether data usage occurring near the end of a current reporting period or the beginning of a new reporting period should be allocated to the current roaming reporting period or home network billing period, or to the next period. The uncertainty may arise from a simple difference in time zones between the home network (which may be the source of data allowance information for the device 100) and the roaming network; for example, a roaming network operator may allocate data usage by the device occurring at 11 p.m. in the device's home network time zone as usage occurring at 2 a.m. in the roaming network operator's time zone, and this allocation may affect the computation of the quota consumed at the device 100. While in theory governing time zone information may be made available to the device 100, in practice a single network may span multiple time zones, roaming agreements may change from time to time, and incomplete information may be conveyed to end users.

Figure 7C:
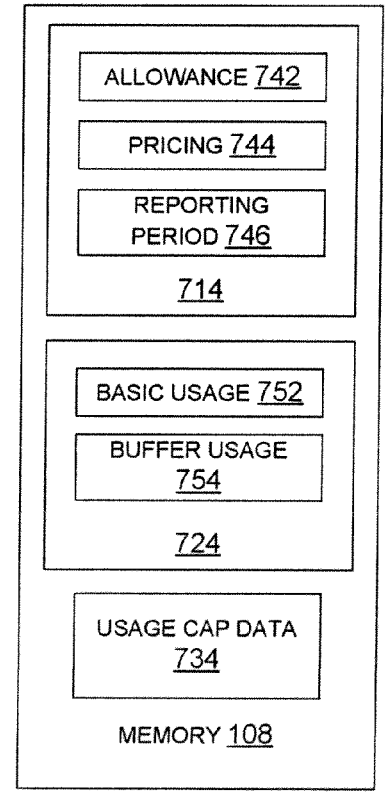

Accordingly, the data stored at the device 100 in respect of a given region or network operator may include data usage information that is maintained as a "buffer" to reduce the likelihood that the user will exceed a defined cap or allowance on data usage while roaming, or alternatively underestimate the remaining capacity available under the established cap or allowance. FIG. 7C illustrates data that may be stored at the device, such as that shown in FIG. 7A, for a given region. The pricing/data allowance data 714 for Region B, for example, may include a data allowance value 742 specifying a basic quota; pricing data 744 for the basic quota and data transfers over the quota; and a definition of a reporting period 746, to which the quota applies (e.g., a date range that is expressly defined with a start date or end date, or a rule defining a regular reporting period such as once a month, every four weeks, or some other period). The usage data 724 that is monitored and recorded at the device 100 may be segregated into two components: a basic usage amount 752 and a buffer usage amount 754. The buffer usage amount 754 may comprise a record of data allowance consumed while accessing data services in that region, where the access takes place during a buffer period defined around the end/beginning of the reporting period 746. The size of the buffer period may be defined with reference to a time zone difference between the home network and the roaming network; for example, if the home network time zone lags the roaming network time zone by a maximum time zone difference of 10 hours, then the buffer period may be defined as the period of 10 hours prior to the end of the reporting period 746. In a first embodiment, any data quota consumption during this buffer period is tracked, but not used in a real-time estimation of quota consumption for the purpose of the current reporting or billing period. Data usage monitored prior to the buffer period is stored as basic usage data 752 for the current reporting or billing period. Exclusion of the buffer usage data 754 in this manner reduces the likelihood that the real-time usage will be overestimated at the device 100. In an alternate embodiment, the buffer usage data 754 is included in real-time usage estimations to provide an additional "cushion" to ensure that data consumption does not exceed any established cap or allowance.

A method for tracking and reconciling data allowance consumption using the buffer usage data is illustrated in FIG. 16. At 1600 a new monitoring period commences; this may be defined by the reporting period 746 associated with a given roaming area, if data consumption in that region is being monitored. Based on the data allowance data and pricing info available to the device 100, the device 100 engages in data usage monitoring and implementation of any necessary management protocols at 1605, as described generally above. At 1610, the device 100 receives updated quota data, likely from the home network operator, either through a billing statement received electronically at the device or another report received from the home network operator (which may be delivered to the device in a message, such as e-mail, SMS, and the like, received by the device 100 in response to a request transmitted from the device, or alternatively pushed to the device SIM/RUIM 126 or memory 108 by another method). This updated info is reconciled against the real-time usage data collected by the device 100. If it is determined that all device-monitored real-time usage data is included in the update received from the operator at 1620—for example, any deviation between the quantity of data transferred estimated by the device and the reported quantity is within a predetermined error range, or all dates of data usage recorded by the network operator correspond to the dates of data usage recorded at the device 100, regardless whether the quantities are accurate—then at 1635 any real-time data usage data stored at the device 100 may be discarded. If, however, it is determined that some of the real-time data usage information is not reflected in the update received from the operator, then at 1625 the excluded usage data is allocated to the next monitoring period or next update period, and is not discarded by the device 100. All remaining, reconciled data is discarded at 1630. At 1640, it is determined whether the current monitoring period has ended. If it has, a new monitoring period begins at 1600.

The foregoing systems and methods thus provide a means to control access to the router or hotspot feature provided by the communication device 100. If the hotspot functionality is integrated in the communication device 100, but is rather implemented in a separate hotspot device 510 as in FIGS. 6A and 6B, these systems and methods may be implemented on the communication device 100 or other device 502, 504, 506 that is used to configure the hotspot device 510. The relevant pricing/data allowance, data usage, usage cap, and device priority data may be stored either at the hotspot device 510 itself, or alternatively at the device 100, 502, 504, 506 used to configure the hotspot device 510.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A mobile device, comprising:
   at least one wireless communication subsystem;
   a processor in operative communication with the at least one wireless communication subsystem, the processor being configured to:
      establish a wireless connection over a wireless network for accessing one or more data services for consumption by the mobile device;
      transfer a first amount of data between the mobile device and the wireless network via the at least one wireless communication subsystem for consumption by the mobile device;
      establish a local wireless ad hoc network with at least one user device, wherein the mobile device provides access to the one or more data services over the wireless network for consumption by the at least one user device;
      monitor a total amount of data transferred between the mobile device and the wireless network, the total amount of data including the first amount of data and a further amount of data transferred between the mobile device and the wireless network via the at least one wireless communication subsystem for accessing the one or more data services for consumption by each user device of the at least one user device; and
      when the total amount of data transferred reaches a usage cap defined for the mobile device, implement a management protocol to manage connectivity of the at least one user device in the local wireless ad hoc network.

2. The mobile device of claim 1, wherein the processor is further configured to receive an instruction via a user input interface to override the management protocol in respect of the at least one user device when the total amount of data reaches the usage cap defined for the mobile device.

3. The mobile device of claim 1, wherein the at least one user device comprises a plurality of user devices, and the processor is further configured to receive input assigning a priority to each of the plurality of user devices, the management protocol being implemented against the plurality of user devices in accordance with their assigned priority.

4. The mobile device of claim 1, wherein the at least one user device is selected from the group consisting of: laptops, tablets, smartphones, personal digital assistants, personal computers, and cameras.

5. The mobile device of claim 1, wherein the mobile device is either a smartphone or a tablet.

6. The mobile device of claim 1, wherein the processor is further configured to receive via a user input interface and store in memory of the mobile device an input value comprising a limit on a cost of data services incurred by the mobile device, the input value defining the usage cap.

7. The mobile device of claim 1, wherein the usage cap defined for the mobile device is a first usage cap associated with data transfer while the mobile device is connected to a home wireless network, and the processor is configured to:
   store, in memory of the mobile device, the first usage cap and a second usage cap associated with data transfer while the mobile device is roaming,
   such that the management protocol is implemented when either the total amount of data transferred while the mobile device is connected to the home wireless network reaches the first usage cap, or the total amount of data transferred while the mobile device is roaming reaches the second usage cap.

8. The mobile device of claim 1, wherein the management protocol comprises disconnecting one or more of the at least one user device in the local wireless ad hoc network, while the mobile device maintains access to the one or more data services for consumption by the mobile device.

9. A method implemented by a mobile device, the method comprising:
   establishing a wireless connection over a wireless network for accessing one or more data services for consumption by the mobile device;
   transferring a first amount of data between the mobile device and the wireless network via at least one wireless communication subsystem for consumption by the mobile device;
   establishing a local wireless ad hoc network with at least one user device and providing access to the one or more data services over the wireless network for consumption by the at least one user device;
   monitoring a total amount of data transferred between the mobile device and the wireless network, the total amount of data including the first amount of data and a further amount of data transferred between the mobile device and the wireless network via the at least one wireless communication subsystem for accessing the one or more data services for consumption by each user device of the at least one user device; and
   when the total amount of data transferred reaches a usage cap defined for the mobile device, implementing a management protocol to manage connectivity of the at least one user device in the local wireless ad hoc network.

10. The method of claim 9, further comprising receiving an instruction via a user input interface of the mobile device to override the management protocol in respect of the at least one user device when the total amount of data reaches the usage cap defined for the mobile device.

11. The method of claim 9, wherein the at least one user device comprises a plurality of user devices, the method further comprising receiving input assigning a priority to each of the plurality of user devices, the management protocol being implemented against the plurality of user devices in accordance with their assigned priority.

12. The method of claim 9, wherein the at least one user device is selected from the group consisting of: laptops, tablets, smartphones, personal digital assistants, personal computers, and cameras.

13. The method of claim 9, wherein the mobile device is either a smartphone or a tablet.

14. The method of claim 9, further comprising receiving via a user input interface and storing in memory of the mobile device an input value comprising a limit on a cost of data services incurred by the mobile device, the input value defining the usage cap.

15. The method of claim 9, wherein the usage cap defined for the mobile device is a first usage cap associated with data transfer while the mobile device is connected to a home wireless network, the method further comprising:
    storing, in memory of the mobile device, the first usage cap and a second usage cap associated with data transfer while the mobile device is roaming,
    such that the management protocol is implemented when either the total amount of data transferred while the mobile device is connected to the home wireless network reaches the first usage cap, or the total amount of data transferred while the mobile device is roaming reaches the second usage cap.

16. The method of claim 9, wherein the management protocol comprises disconnecting one or more of the at least one user device in the local wireless ad hoc network, while the mobile device maintains access to the one or more data services for consumption by the mobile device.

17. A non-transitory computer-readable medium comprising code which, when executed by a processor of a mobile device comprising at least one wireless communication subsystem, causes the mobile device to implement the method of:
    establishing a wireless connection over a wireless network for accessing one or more data services for consumption by the mobile device;
    transferring a first amount of data between the mobile device and the wireless network via the at least one wireless communication subsystem for consumption by the mobile device;
    establishing a local wireless ad hoc network with at least one user device and providing access to the one or more data services over the wireless network for consumption by the at least one user device;
    monitoring a total amount of data transferred between the mobile device and the wireless network, the total amount of data including the first amount of data and a further amount of data transferred between the mobile device and the wireless network via the at least one wireless communication subsystem for accessing the one or more data services for consumption by each user device of the at least one user device; and
    when the total amount of data transferred reaches a usage cap defined for the mobile device, implementing a management protocol to manage connectivity of the at least one user device in the local wireless ad hoc network.

* * * * *